(12) United States Patent
Abe et al.

(10) Patent No.: US 10,696,301 B2
(45) Date of Patent: Jun. 30, 2020

(54) VEHICLE CONTROL DEVICE

(71) Applicant: HONDA MOTOR CO., LTD, Minato-ku, Tokyo (JP)

(72) Inventors: Chihiro Abe, Wako (JP); Daichi Kato, Wako (JP); Tadashi Sumioka, Wako (JP); Kazuyuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 15/726,505

(22) Filed: Oct. 6, 2017

(65) Prior Publication Data
US 2018/0099667 A1   Apr. 12, 2018

(30) Foreign Application Priority Data

Oct. 12, 2016 (JP) .................................. 2016-201246

(51) Int. Cl.
*B60W 30/12* (2020.01)
*B62D 15/02* (2006.01)
(Continued)

(52) U.S. Cl.
CPC ............ *B60W 30/12* (2013.01); *B60W 10/20* (2013.01); *B60W 40/072* (2013.01); *B62D 15/025* (2013.01); *G05D 1/0212* (2013.01); *G06K 9/00798* (2013.01); *G08G 1/167* (2013.01); *G05D 2201/0213* (2013.01); *G08G 1/0112* (2013.01); *G08G 1/096775* (2013.01);
(Continued)

(58) Field of Classification Search
CPC ..... B60W 30/12; B60W 10/20; B62D 15/025; G05D 1/0212; G06K 9/00798; G08G 1/167

USPC ........................................................... 701/26
See application file for complete search history.

(56) References Cited

U.S. PATENT DOCUMENTS 9,804,603 B1 * 10/2017 Yegerlehner ......... G05D 1/0212
2010/0023232 A1 * 1/2010 Isaji .................... B60W 30/146
701/70
(Continued)

FOREIGN PATENT DOCUMENTS

JP    2003-203298    7/2003
JP    2013-112067    6/2013
(Continued)

OTHER PUBLICATIONS

Japanese Office Action for Japanese Patent Application No. 2016-201246 dated Aug. 27, 2019.

*Primary Examiner* — Isaac G Smith
(74) *Attorney, Agent, or Firm* — Amin, Turocy & Watson, LLP

(57) ABSTRACT

A vehicle control device is installed in a host vehicle and is configured to be capable of performing automatic driving or providing a driving support. The vehicle control device includes a left/right boundary line generating unit that calculates left and right boundary lines of a travel path on which the host vehicle travels. Further, the vehicle control device includes an ideal travel route generating unit that sets constraint points through which the host vehicle passes within a range of the left and right boundary lines, and furthermore, calculates an ideal travel route in which a curvature with the constraint points serving as a constraint condition, a travel distance, and a difference from a center line are minimized.

11 Claims, 17 Drawing Sheets

(51) Int. Cl.

| | |
|---|---|
| *B60W 10/20* | (2006.01) |
| *B60W 40/072* | (2012.01) |
| *G05D 1/02* | (2020.01) |
| *G06K 9/00* | (2006.01) |
| *G08G 1/16* | (2006.01) |
| G08G 1/0967 | (2006.01) |
| G08G 1/01 | (2006.01) |

(52) U.S. Cl.
CPC . *G08G 1/096783* (2013.01); *G08G 1/096791* (2013.01); *G08G 1/165* (2013.01); *G08G 1/166* (2013.01)

(56) References Cited

U.S. PATENT DOCUMENTS

| | | | |
|---|---|---|---|
| 2010/0030473 A1* | 2/2010 | Au | G01S 17/936 701/301 |
| 2015/0032369 A1* | 1/2015 | Schmidt | B60Q 9/00 701/467 |
| 2017/0267286 A1* | 9/2017 | Takamatsu | B62D 15/025 |
| 2018/0017971 A1* | 1/2018 | Di Cairano | G05D 1/0088 |

FOREIGN PATENT DOCUMENTS

| | | | |
|---|---|---|---|
| JP | 2013112067 A | * | 6/2013 |
| JP | 2015-069274 | | 4/2015 |
| JP | 2016-112911 | | 6/2016 |

\* cited by examiner

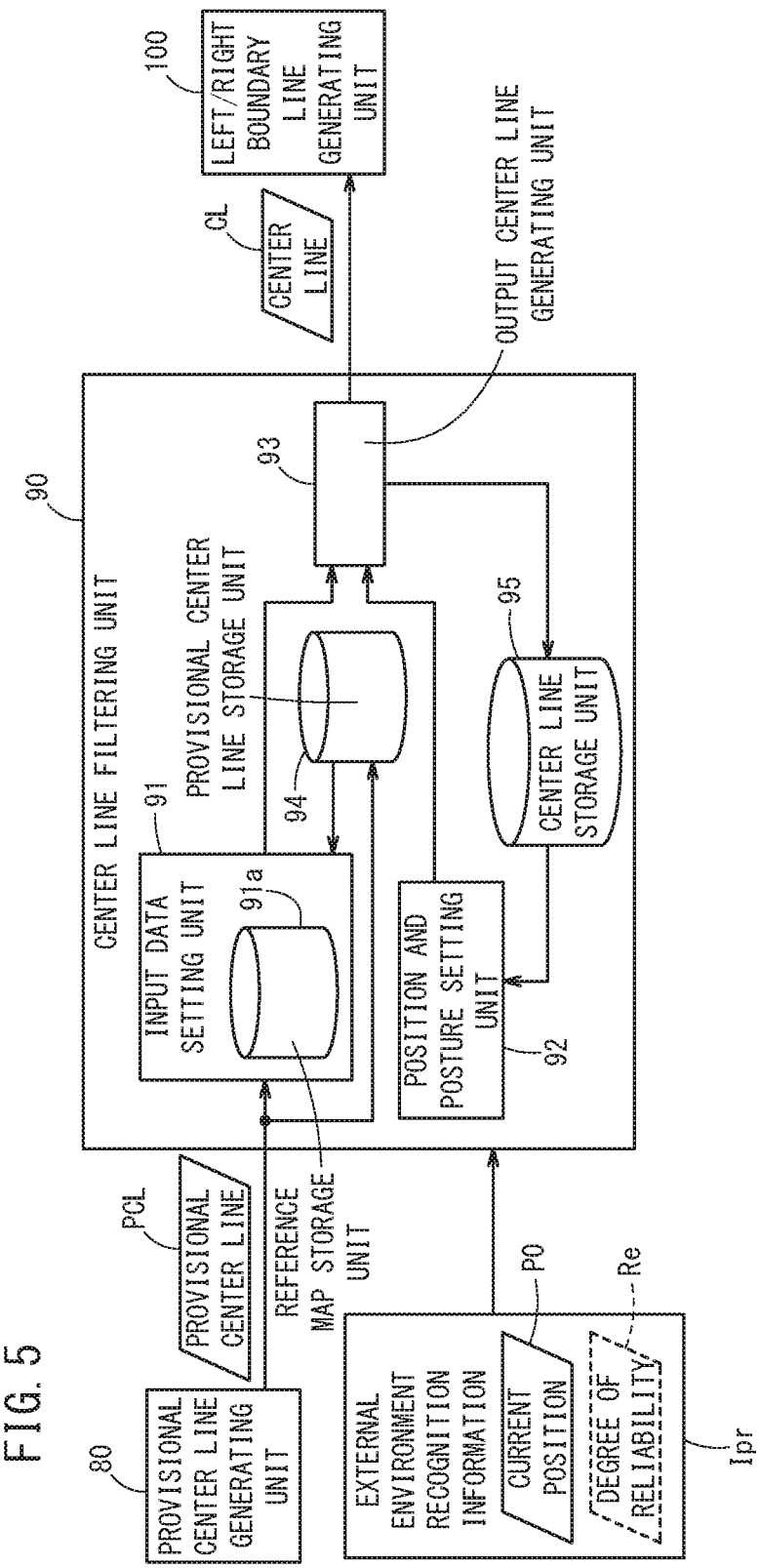

VEHICLE CONTROL DEVICE

CROSS-REFERENCE TO RELATED APPLICATION

This application is based upon and claims the benefit of priority from Japanese Patent Application No. 2016-201246 filed on Oct. 12, 2016, the contents of which are incorporated herein by reference.

BACKGROUND OF THE INVENTION

Field of the Invention

The present invention relates to a vehicle control device which performs automatic driving or provides a driving assist for a vehicle.

Description of the Related Art

In a vehicle control device that performs automatic driving or provides a driving assist for a vehicle (a user's own vehicle, also referred to herein as a "host vehicle"), the surrounding environment of the host vehicle is detected by peripheral recognition sensors (external environment sensors) such as cameras or the like, and on the basis of the information detected thereby, a travel path on which the host vehicle travels is recognized (see Japanese Laid-Open Patent Publication No. 2016-112911). For example, the vehicle control device disclosed in Japanese Laid-Open Patent Publication No. 2016-112911 calculates a center line of the recognized travel path, and performs a control so that the host vehicle travels along the center line.

However, it cannot be said that the traveling efficiency is good, simply by controlling traveling of the vehicle so as to follow along the center line that is calculated on the basis of detection information from the external environment sensors. For example, the shape of the travel path to be recognized is easily changed due to the presence of noise when detecting left and right boundary lines of the travel path, and without a guarantee of time-sequential continuity, there is a possibility for the host vehicle to meander unnecessarily. Also, at a curve, when traveling in an out-in-out manner (in other words, so as to reduce the curvature) rather than traveling along the center line, it is less likely for the vehicle speed to decrease, and further, unnecessary movement of the steering wheel is reduced, and comfortable traveling is made more feasible.

SUMMARY OF THE INVENTION

The present invention has been devised in view of the aforementioned circumstances, and has the object of providing a vehicle control device which, during automatic driving or when providing a driving assist, enables a host vehicle to travel in a satisfactory manner by calculating an ideal travel route that is superior in terms of traveling efficiency and comfort.

In order to achieve the above-described object, the present invention is characterized by a vehicle control device which is installed in a host vehicle and configured to be capable of implementing automatic driving or providing a driving assist, comprising an information acquisition unit adapted to calculate or acquire information indicative of a left and right travel capable range of a travel path on which the host vehicle travels, and a travel route calculating unit adapted to set passage points through which the host vehicle passes within the left and right travel capable range, and furthermore, to calculate an ideal travel route in which a curvature of a state in which the passage points are arranged, a travel distance, and a difference from a center line of the left and right travel capable range are minimized.

According to the present invention, as described above, the vehicle control device includes the travel route calculating unit, whereby an ideal travel route is provided in which traveling efficiency and comfort during automatic driving or when providing a driving assist are superior. More specifically, the ideal travel route is calculated as a route that minimizes the curvature, the travel distance, and the difference from the center line, so that, for example, in the case of a curve or the like, a travel route is shown in which curvature is reduced, and a reduction in vehicle velocity and unnecessary movement of the steering wheel are suppressed. Therefore, by adjusting the velocity and the steering angle during traveling so as to enable the ideal travel route to be followed to the greatest extent possible, the vehicle control device can cause the host vehicle to travel in a satisfactory manner.

In this case, the vehicle control device preferably includes an ideal travel route storage unit in which there is stored a prior ideal travel route that was calculated by the travel route calculating unit, and the travel route calculating unit preferably sets the passage points on the basis of the prior ideal travel route.

The passage points, which are set on the basis of the prior ideal travel route, reflect a previous travel target of the host vehicle. Therefore, the passage points can be used as a constraint condition (constraint points) for the host vehicle when generating a new ideal travel route, and thus the ideal travel route can be calculated with high accuracy by a function that takes into consideration the constraint condition.

In addition to the above-described configuration, the left and right travel capable range and the ideal travel route may contain information of a sequence of points in which a plurality of coordinate points are arranged, and the travel route calculating unit may include a passage point calculating unit adapted to calculate interpolation lines by interpolating a plurality of coordinate points of the prior ideal travel route in accordance with a predetermined interpolation method, and to calculate as the passage points intersection points between the interpolation lines and line segments that connect pairs of coordinate points in the left and right travel capable range.

The passage point calculating unit can easily and quickly set the passage points by interpolating the sequence of points of the prior ideal travel route and thereby generate the interpolation lines.

Furthermore, the travel route calculating unit may include a route range setting unit adapted to set an extraction area within a predetermined distance from the prior ideal travel route and the current position of the host vehicle, and the passage point calculating unit may calculate the passage points inside of the set extraction area.

The extraction area is set by the route range setting unit, whereby the travel route calculating unit is capable of enhancing efficiency in calculating the interpolation lines and the ideal travel route.

Further, the travel route calculating unit may calculate the ideal travel route by solving a convex quadratic programming problem, in which there are used an objective function of the curvature, the travel distance, or the difference, and a constraint condition including the passage points.

By solving such a convex quadratic programming problem using the objective function and the constraint condition described above, the vehicle control device can easily obtain the ideal travel route in which the curvature, the travel distance, and the difference are minimized.

In addition, the ideal travel route is constituted by a plurality of coordinate points, and the travel route calculating unit preferably includes a point sequence interval correction unit adapted to adjust an interval between the coordinate points of the ideal travel route.

By the point sequence interval correction unit adjusting the interval between the coordinate points of the ideal travel route, data of the ideal travel route coordinate points can be handled easily when processing is performed using the ideal travel route in a subsequent generation of trajectories or the like.

Furthermore, the information acquisition unit preferably calculates the information indicative of the left and right travel capable range on the basis of information relating to a center line of the travel path.

By the vehicle control device calculating the information indicative of the left and right travel capable range based on information relating to the center line of the travel path, even if the information detected by the external environment sensors or the like is insufficient, based on the information relating to the center line, it is possible to obtain the information indicative of the left and right travel capable range with high accuracy. Accordingly, the ideal travel route is also calculated accurately.

In this case, the vehicle control device preferably further comprises an external environment sensor adapted to detect information of the external environment of the host vehicle, an external environment recognition unit adapted to recognize travel path regulating objects that regulate left and right boundaries of the travel path on the basis of detection information from the external environment sensor, a provisional center line generating unit adapted to generate a provisional center line of the travel path on the basis of the travel path regulating objects recognized by the external environment recognition unit, and a filtering unit adapted to calculate the center line by filtering the provisional center line generated by the provisional center line generating unit.

In the vehicle control device, the filtering unit filters the provisional center line generated by the provisional center line generating unit, whereby the center line that is generated can be further optimized.

Further, the provisional center line may include information of a sequence of points in which a plurality of coordinate points are arranged, and the filtering unit may include an input data setting unit adapted to set input data including the plurality of coordinate points of the provisional center line, and a center line calculating unit adapted to calculate the center line from the input data using a least squares method.

By utilizing a method of least squares on the input data that was set by the input data setting unit and thereby calculating the center line, the center line calculating unit is capable of calculating the center line with a small error.

The vehicle control device may further include a provisional center line storage unit in which the provisional center line is stored, wherein the input data setting unit sets the input data using a most recent provisional center line, and a plurality of prior provisional center lines that have been stored in the provisional center line storage unit.

By setting the input data using the most recent provisional center line and the plurality of prior provisional center lines, it is possible to obtain a center line to which prior information has been added, and thereby prevent an inconvenience such as the center line that is calculated being shifted in position significantly from the prior center line.

In addition, the input data setting unit may set the input data by excluding, from among the plurality of prior provisional center lines, a nearby range in the vicinity of the host vehicle, and a far distant range separated a predetermined distance or more away from the host vehicle.

Since the accuracy of the travel information is low in the provisional center lines in the nearby range and the far distant range of the host vehicle, by omitting such ranges, the vehicle control device can calculate the center line with higher accuracy.

Still further, the input data setting unit may set the input data by assigning weights, respectively, to the most recent provisional center line and the plurality of prior provisional center lines.

By assigning weights to the most recent provisional center line and the plurality of prior provisional center lines, the vehicle control device enables a weighted least squares method to be performed by the center line calculating unit, and thus it is possible to calculate the center line with better accuracy.

Further still, the vehicle control device may further comprise a center line storage unit in which the center line calculated by the center line calculating unit is stored, and the filtering unit may comprise a position and posture setting unit adapted to set and supply to the center line calculating unit, as constraint conditions of the least squares method, the current position of the host vehicle, and the posture of the host vehicle based on a prior center line stored in the center line storage unit.

The center line calculating unit can carry out the least squares method with the current position and posture of the host vehicle serving as constraint conditions. Thus, it is possible to prevent calculation of a center line that is deviated significantly from the current position of the host vehicle, or a posture of the host vehicle that changes abruptly and cannot be followed, or the like.

In addition to the above, the position and posture setting unit may calculate a tangent line by differentiating the prior center line at a point nearest to the current position of the host vehicle from among the coordinate points of the prior center line, and may take the tangent line to be the posture of the host vehicle.

Owing to this feature, the position and posture setting unit can easily obtain the posture of the host vehicle.

According to the present invention, during automatic driving or when providing a driving assist, the vehicle control device can cause the host vehicle to travel in a satisfactory manner by calculating an ideal travel route that is superior in terms of traveling efficiency and comfort.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a block diagram showing the configuration of a center line filtering unit depicted in FIG. 3;

DESCRIPTION OF THE PREFERRED EMBODIMENTS

A preferred embodiment of a vehicle control device according to the present invention will be presented and described in detail below with reference to the accompanying drawings.

Figure 1:
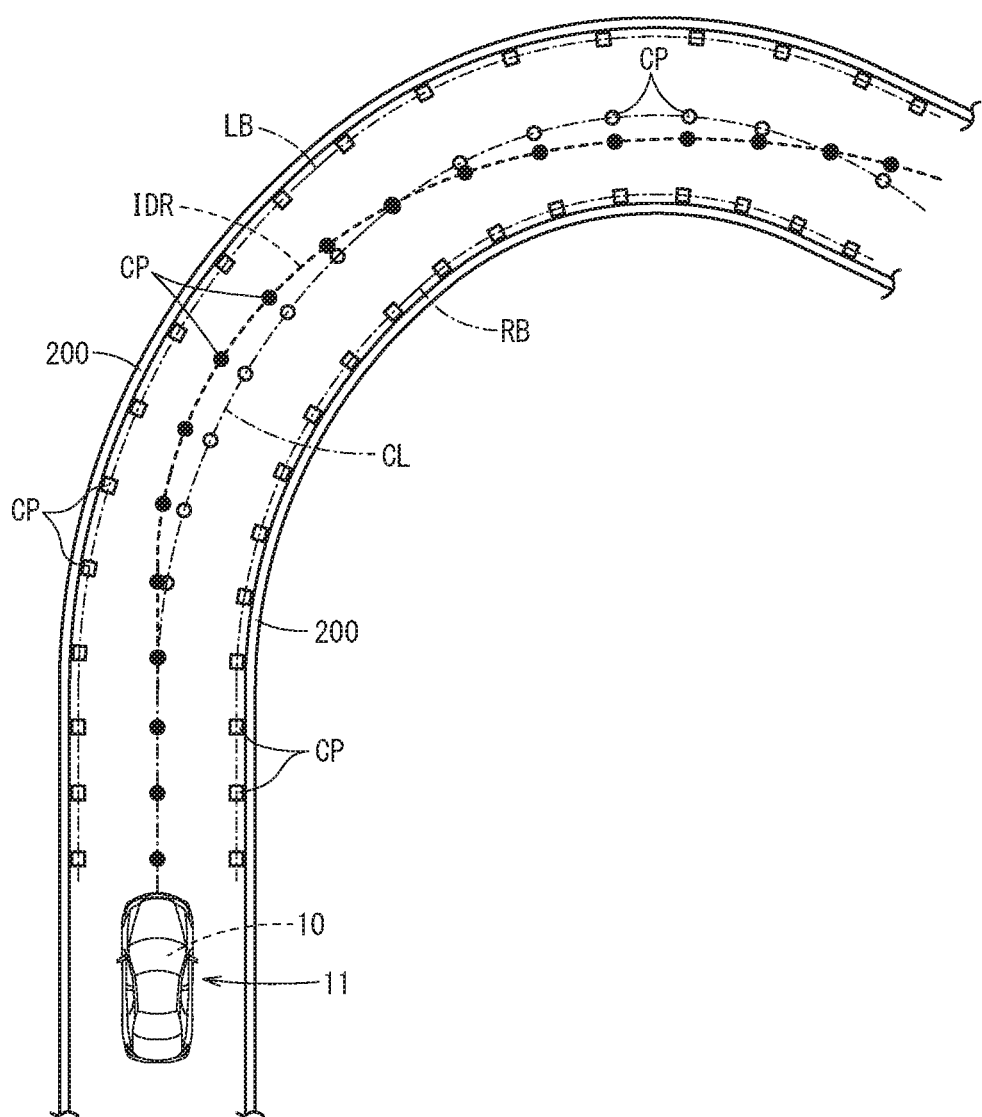
FIG. 1 is a plan view showing a center line, left and right boundary lines, and an ideal travel route generated by a vehicle control device according to an embodiment of the present invention.

As shown in FIG. 1, the vehicle control device 10 according to one embodiment of the present invention is installed in a vehicle 11 (hereinafter also referred to as a host vehicle 11) and controls automatic driving of the host vehicle 11. In such automatic driving, a speed control (acceleration, deceleration, speed maintenance, etc.) for adjusting the vehicle velocity of the host vehicle 11, and a steering angle control for adjusting the direction of travel of the host vehicle 11 are performed in an integral manner. Further, at this time, the vehicle control device 10 recognizes the surrounding environment of the host vehicle 11 including a travel path, and causes the host vehicle 11 to travel along an appropriate route on the travel path.

In particular, the vehicle control device 10 is configured so as to calculate, on the basis of a state (shape, etc.) of the travel path, an ideal travel route IDR in consideration of comfort and traveling efficiency during traveling of the host vehicle 11. In accordance with this feature, the vehicle control device 10 generates a trajectory (information to instruct the velocity and the steering angle of the host vehicle 11) that conforms insofar as possible to the calculated ideal travel route IDR, and enables the host vehicle 11 to travel in a satisfactory manner. The vehicle control device 10 will be described in detail below.

[Overall Configuration of Host Vehicle 11]

Figure 2:
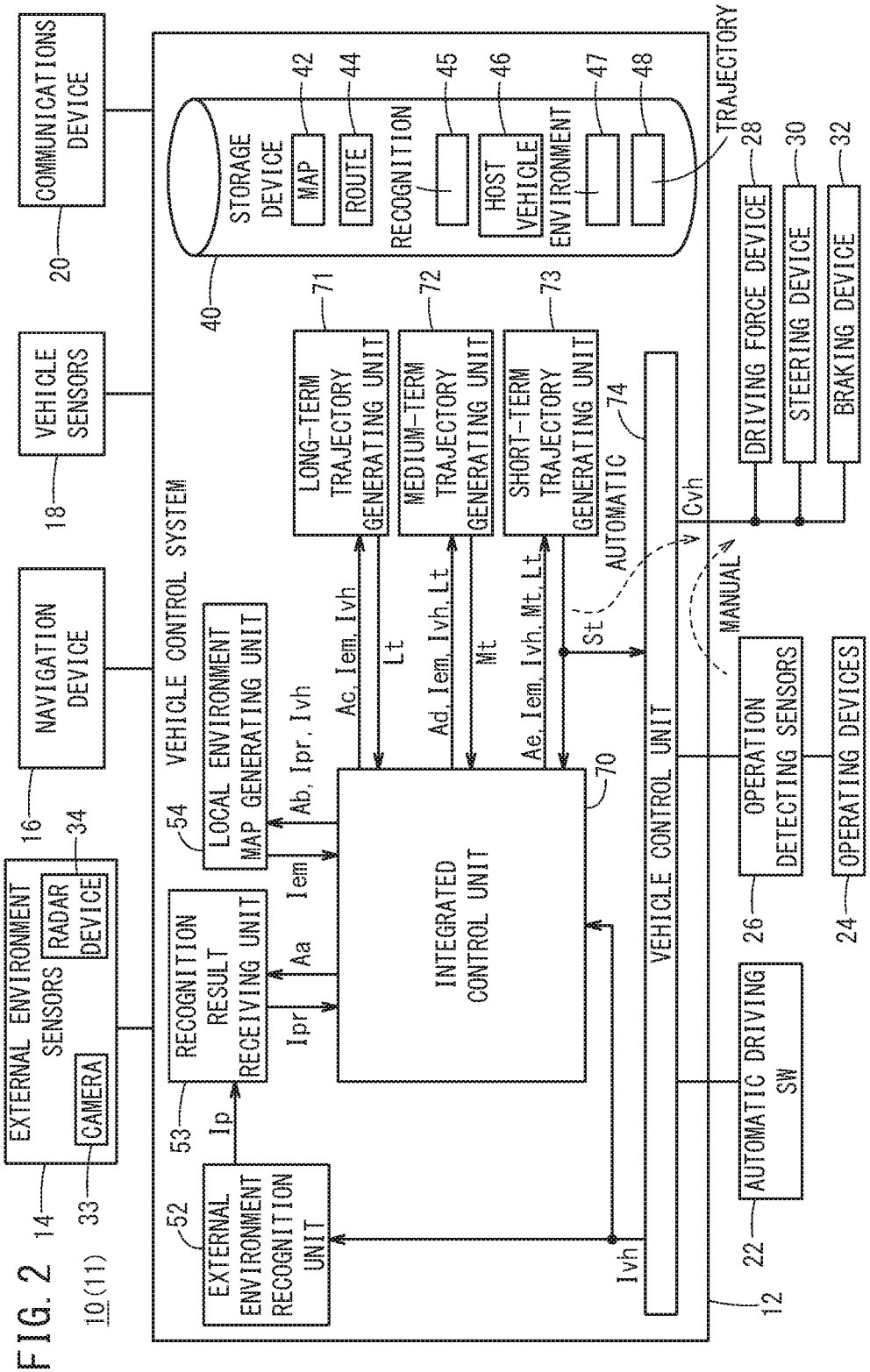
FIG. 2 is a schematic configuration diagram of the vehicle control device of FIG. 1.

As shown in FIG. 2, the vehicle control device 10 includes a vehicle control system 12 (electronic control unit) which makes up a principal component of a system that carries out processes during traveling of the host vehicle 11, and is further equipped with input devices and output devices that are connected via communication lines to the vehicle control system 12. The input devices include external environment sensors 14, a navigation device 16, vehicle sensors 18, a communications device 20, an automatic driving switch 22 (automatic driving SW), and operation detecting sensors 26, etc. The output devices include a driving force device 28, a steering device 30, and a braking device 32, etc.

The external environment sensors 14 are a group of sensor devices that recognize the situation outside of the host vehicle 11, and according to the present embodiment, are constituted by one or more cameras 33 and one or more radar devices 34. The cameras 33 and the radar devices 34 detect the external environment in accordance with respective characteristics thereof, and output detection information to the vehicle control system 12. Moreover, the external environment sensors 14 may be constituted by one type of device, or other devices may be applied thereto. Examples of such other devices include an infrared sensor, an ultrasonic sensor, and a LIDAR (light detection and ranging) device.

The navigation device 16 detects and specifies a current position of the host vehicle 11 using a satellite positioning device or the like, and further calculates a route from the current position to a destination point designated by the user. Information of the navigation device 16 (map information, the current position, the calculated route, etc.) is supplied to the vehicle control system 12 as required, and is stored in the map information storage unit 42 and a route information storage unit 44 of a storage device 40.

The vehicle sensors 18 are a sensor device group (vehicle state detection unit) that detects the state of the host vehicle 11, and outputs the detected result thereof to the vehicle control system 12 during traveling of the host vehicle 11 or the like. As members of the sensor device group, there may be cited a vehicle velocity sensor for detecting the vehicle velocity, and an acceleration sensor for detecting the acceleration of the host vehicle 11, a yaw rate sensor for detecting the angular velocity about a vertical axis of the host vehicle 11, an orientation sensor for detecting an orientation of the host vehicle 11, and a gradient sensor for detecting a gradient of the host vehicle 11, etc. Detection information detected by the vehicle sensors 18 (or a vehicle control unit 74) is stored as vehicle state information Ivh of the host vehicle in a host vehicle state information storage unit 46 of the storage device 40.

The communications device 20 is provided for the purpose of communicating with external communication devices (roadside devices, other vehicles, a server, etc.) that exist outside of the host vehicle 11. For example, the communications device 20 receives information (position and light colors) concerned with traffic signals from the roadside devices, probe information concerned with other vehicles from the other vehicles, and updated map information or other information from the server, and further, transmits probe information and the like of the host vehicle 11 to the exterior.

The automatic driving switch 22 is a switch to enable the driver to switch between a manual driving mode and an automatic driving mode. In the manual driving mode, the driver operates the operating devices 24 of the host vehicle 11, and thereby operates the output devices (the driving force device 28, the steering device 30, and the braking device 32) to cause the host vehicle 11 to travel or the like.

As the operating devices 24, there may be cited an accelerator pedal, a steering wheel (handle), a brake pedal, a shift lever, and a direction indicating (turn signal) lever. Further, the operation detecting sensors 26, which detect the presence or absence or the operated amounts of operations made by the driver, as well as operated positions, are attached to the respective structures of the operating devices 24. The operation detecting sensors 26 output to the vehicle control system 12 as detection results an amount by which the accelerator is depressed (degree of accelerator opening), an amount (steering amount) at which the steering wheel is operated, an amount by which the brake pedal is depressed, a shift position, and a right or left turn direction, etc.

In the automatic driving mode, the host vehicle 11 is made to travel or the like under the control of the vehicle control device 10, in a state in which the driver does not operate the operating devices 24. During execution of the automatic driving mode, and on the basis of the surrounding environment of the host vehicle 11, the vehicle control system 12 generates action plans (long-term trajectories, medium-term trajectories, short-term trajectories, to be described later) and appropriately controls the output devices (the driving force device 28, the steering device 30, the braking device 32) in accordance with the action plans.

The driving force device 28 includes a non-illustrated driving force ECU, and a drive source such as an engine and a drive motor or the like. The driving force device 28 generates a travel driving force (torque) in accordance with vehicle control values Cvh input thereto from the vehicle control system 12, and transmits the travel driving force to the vehicle wheels directly or through a transmission.

The steering device 30 includes a non-illustrated EPS (electric power steering) ECU, and an EPS device. The steering device 30 changes the orientation of the wheels (steered wheels) in accordance with vehicle control values Cvh input thereto from the vehicle control system 12.

The braking device 32, for example, is an electric servo brake used in combination with a hydraulic brake, and includes a non-illustrated brake ECU and a brake actuator. The braking device 32 brakes the vehicle wheels in accordance with vehicle control values Cvh input thereto from the vehicle control system 12.

[Configuration of Vehicle Control System 12]

The vehicle control system 12 is constituted as an electronic control unit (ECU) equipped with a processor and an input/output interface (neither of which is shown), and the storage device 40 as hardware components, and further, is constructed with a plurality of function realizing units therein. More specifically, the function realizing units include an external environment recognition unit 52, a recognition result receiving unit 53, a local environment map generating unit 54, an integrated control unit 70 (task synchronization module), a long-term trajectory generating unit 71, a medium-term trajectory generating unit 72, a short-term trajectory generating unit 73, and a vehicle control unit 74. In the present embodiment, the function realizing units are software-based functional units, in which the functions thereof are realized by a processor executing programs stored in the storage device 40. However, the functions thereof can also be realized by hardware-based functional units constituted from integrated circuits or the like.

The external environment recognition unit 52 utilizes the various detection information input from the external environment sensors 14, the navigation device 16, the communications device 20, and the like, and generates information (hereinafter referred to as external environment recognition results Ip) of the results of having extracted objects existing outside of the host vehicle 11. When the external recognition results Ip are generated, reference is made to the detected results of the radar devices 34, etc., as well as the host vehicle state information Ivh transmitted from the vehicle sensors 18 and the vehicle control unit 74, and a relative positional relationship of objects with respect to the host vehicle 11 (a direction and distance of such objects with respect to the host vehicle 11) is also recognized. At this time, the external environment recognition unit 52 may recognize the relative positional relationship by arranging the extracted objects on a two-dimensional plane (host vehicle coordinate system) with the host vehicle 11 acting as a reference.

For example, on the basis of image information from the cameras 33, the external environment recognition unit 52 extracts lane markings (white lines, yellow lines, markers, etc.), guardrails, curbstones, stop lines, traffic lights (traffic signal stop lines), and other objects such as signs, obstacles, traffic participants, etc., of a road on which the host vehicle 11 travels. In this instance, features that define a travel capable range of the travel path, such as lane markings, guardrails, curbstones, and the like, can be regarded as static information in which no changes occur within a short time period. Hereinafter, such features are referred to collectively as travel path regulating objects 200 (see FIG. 1). On the other hand, obstacles and traffic participants can be regarded as dynamic information in which changes occur therein within a short time period.

Figure 3:
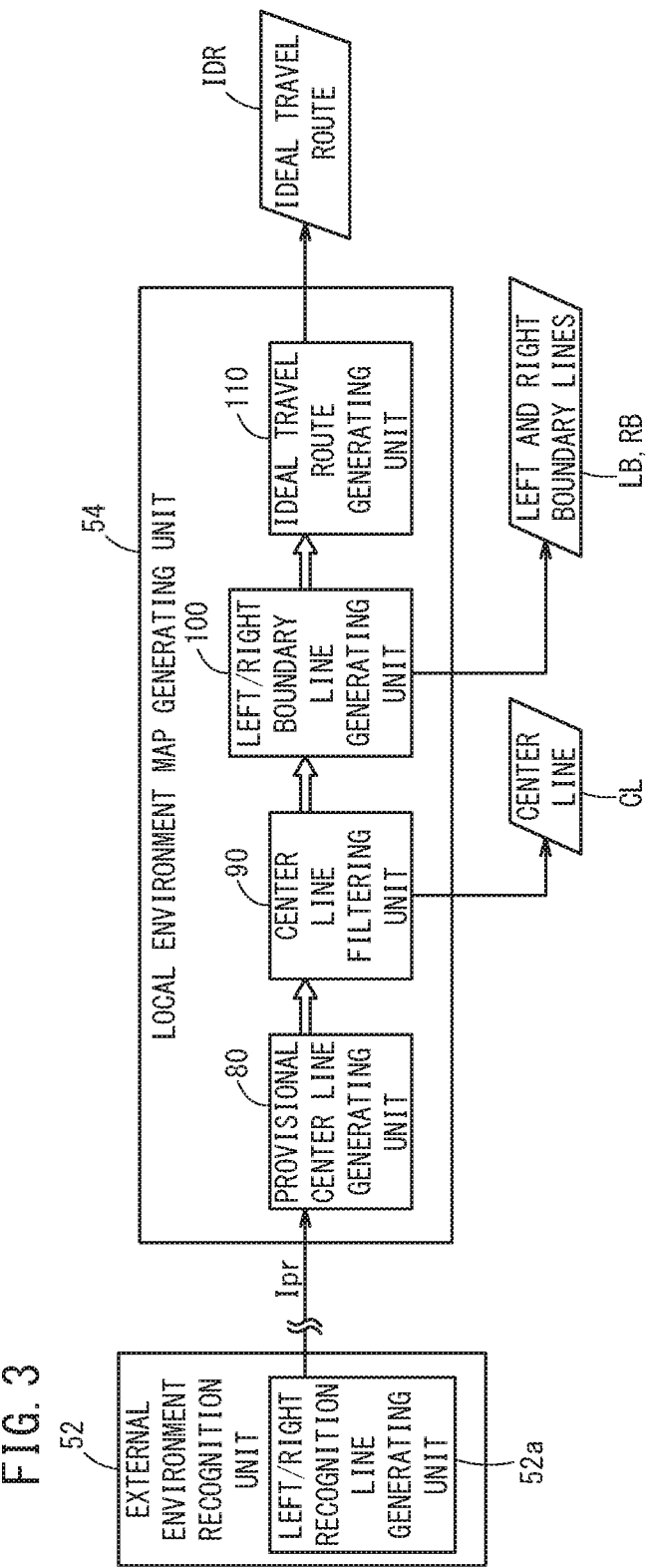
FIG. 3 is a block diagram showing the configuration of a local environment map generating unit depicted in FIG. 2.

As shown in FIG. 3, in the interior of the external environment recognition unit 52, a left/right recognition line generating unit 52a is provided, which based on recognizing the travel path regulating objects 200, generates a left recognition line $y_l$ and a right recognition line $y_r$ (see FIG. 4) as recognition information indicative of a left and right travel capable range. The left and right recognition lines $y_l$, $y_r$ are constituted as a sequence of points in which a plurality of coordinate points CP are arranged on the host vehicle coordinate system (on a two-dimensional coordinate plane) with the host vehicle 11 acting as a reference. Upon processing the detection information, and extracting the travel path regulating objects 200 on the left and right of the travel path on which the host vehicle 11 travels, the left/right recognition line generating unit 52a performs a polynomial approximation on the travel path regulating objects 200, and thereby generates the left and right recognition lines $y_l$, $y_r$.

Figure 4:
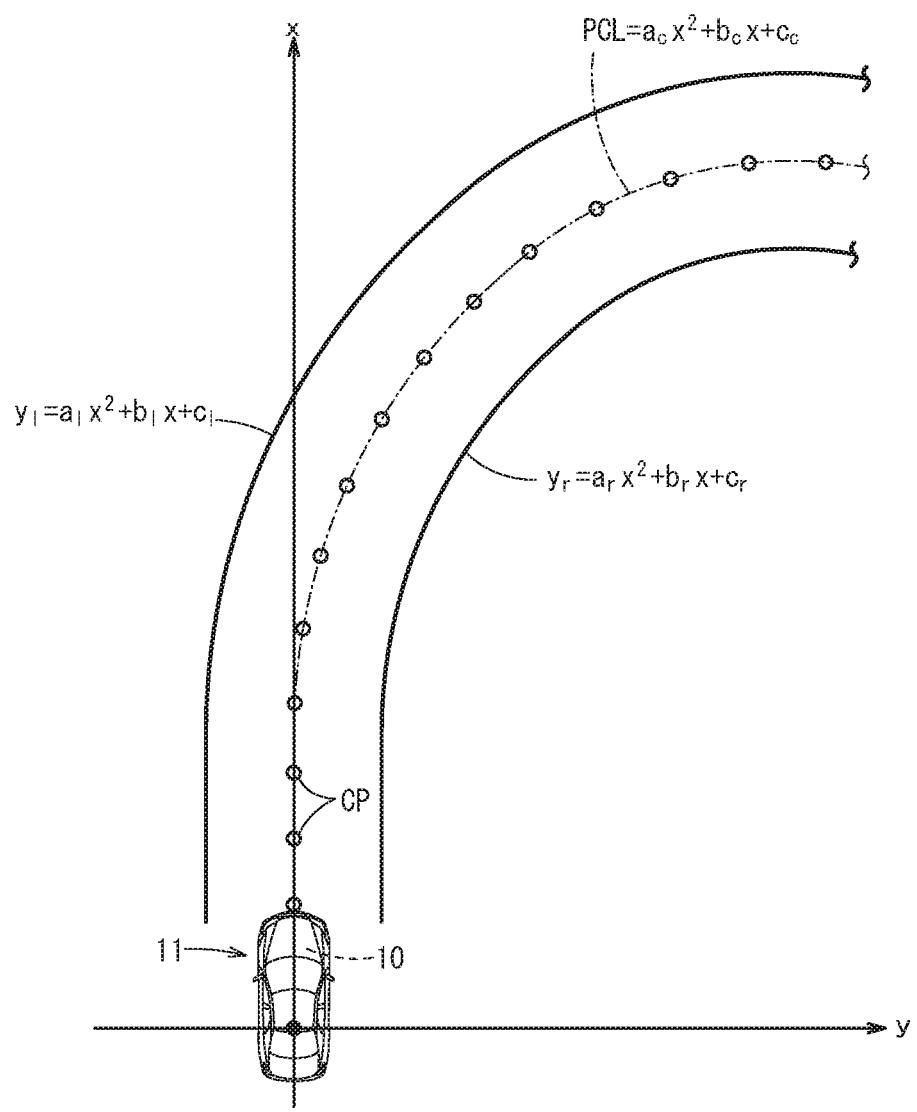
FIG. 4 is an explanatory diagram for explaining a process of a provisional center line generating unit for calculating a provisional center line.

For example, as shown in FIG. 4, in the polynomial approximation of the host vehicle coordinate system, the left recognition line and the right recognition line of the host vehicle 11 are expressed by the following equations (1) and (2).

Left Recognition Line:

$$y_l = a_l x^2 + b_l x + c_l \tag{1}$$

Right Recognition line:

$$y_r = a_r x^2 + b_r x + c_r \qquad (2)$$

Even if actual lane markings, guardrails, curbstones and the like on the travel path are lost by performing a polynomial approximation such as that of equations (1) and (2), it is possible to calculate such features as supplemental lines. Moreover, in equations (1) and (2) above, the left and right recognition lines $y_l$, $y_r$ are approximated by second order functions, however, a polynomial approximation of a different order may be carried out. Further, the left and right recognition lines $y_l$, $y_r$ may be generated by the local environment map generating unit 54.

Returning to FIG. 2, the recognition result receiving unit 53 periodically receives the external environment recognition results Ip (including the left and right recognition lines $y_l$, $y_r$) recognized by the external environment recognition unit 52, and updates any old information. In addition, at a timing at which a calculation command Aa is received from the integrated control unit 70, the recognition result receiving unit 53 transmits to the integrated control unit 70 the external environment recognition results Ip as external environment recognition information Ipr. Such external environment recognition information Ipr is stored in an external environment recognition information storage unit 45 of the storage device 40 as individual information or integrated information of each of the objects extracted from the external recognition results Ip.

Based on the external environment recognition information Ipr and the host vehicle state information Ivh, the local environment map generating unit 54 calculates a route along which the host vehicle 11 travels, and generates local environment map information Iem. The local environment map generating unit 54 receives, at an appropriate timing from the integrated control unit 70, an calculation command Ab, the external environment recognition information Ipr, and the host vehicle state information Ivh, and performs calculations in order to obtain the local environment map information Iem. The local environment map information Iem is stored in a local environment map information storage unit 47 of the storage device 40. The specific configuration of the local environment map generating unit 54 will be described in detail later.

The integrated control unit 70, together with synchronizing the tasks (processing operations) of the recognition result receiving unit 53, the local environment map generating unit 54, the long-term trajectory generating unit 71, the medium-term trajectory generating unit 72, and the short-term trajectory generating unit 73, provides information necessary for calculations to the respective function realizing units. The integrated control unit 70 internally counts a standard calculation cycle, and outputs calculation commands to each of the function realizing units in accordance with a timing based on the standard calculation cycle, to thereby execute the processes and receive the processing results thereof.

On the other hand, under commands from the integrated control unit 70, the long-term trajectory generating unit 71, the medium-term trajectory generating unit 72, and the short-term trajectory generating unit 73 generate trajectories, respectively, including vehicle velocities necessary for controlling the velocity of the host vehicle 11, and routes necessary for controlling the steering of the host vehicle 11. The long-term trajectory generating unit 71 generates a long-term trajectory Lt, which is a trajectory having a somewhat long period (for example, ten seconds) during traveling of the host vehicle 11. The medium-term trajectory generating unit 72 generates a medium-term trajectory Mt, which is a trajectory having a period that is shorter than the long-term trajectory Lt (for example, five seconds). The short-term trajectory generating unit 73 generates a short-term trajectory St, which is a trajectory having a period that is shorter than the medium-term trajectory Mt (for example, one second).

More specifically, the long-term trajectory generating unit 71 generates the long-term trajectory Lt on the basis of a calculation command Ac output from the integrated control unit 70, the local environment map information Iem, and the host vehicle state information Ivh, etc. The long-term trajectory Lt is calculated as a sequence of points indicating long-term travel targets in consideration of riding comfort (abrupt steering and abrupt acceleration/deceleration, etc., are not carried out), primarily on the basis of left and right boundary line information, center line information, and ideal route information of the local environment map information Iem. The long-term trajectory Lt is calculated in the form of information obtained by arranging a plurality of coordinate points whose timewise distance is relatively longer than that of the medium-term trajectory Mt.

For example, the long-term trajectory generating unit 71 generates the long-term trajectory Lt in which coordinate points thereof including time or velocity information are arranged in a time period of ten seconds and at intervals on the order of several hundreds of ms (nine times the standard calculation period), and then outputs the long-term trajectory Lt to the integrated control unit 70. The long-term trajectory Lt is stored in a trajectory information storage unit 48 of the storage device 40.

The medium-term trajectory generating unit 72 generates the medium-term trajectory Mt on the basis of a calculation command Ad output from the integrated control unit 70, the local environment map information Iem, the host vehicle state information Ivh, and the long-term trajectory Lt. The medium-term trajectory Mt is calculated as a sequence of points taking into account the dynamic information included in the local environment map information Iem, in order to indicate travel targets which are capable of coping with situations of a few seconds ahead in the vicinity of the host vehicle 11. For example, in the case that the external environment recognition unit 52 discovers a parked vehicle (an obstacle: dynamic information) located in front in the direction of travel of the host vehicle 11, then based on the medium-term trajectory Mt which is generated by the medium-term trajectory generating unit 72, and the short-term trajectory St which is generated by the short-term trajectory generating unit 73, the host vehicle 11 can avoid coming into contact with the parked vehicle.

For example, the medium-term trajectory generating unit 72 generates the medium-term trajectory Mt in which coordinate points thereof including time or velocity information are arranged in a time period of five seconds and at intervals on the order of one hundred and several tens of ms (three times the standard calculation period), and then outputs the medium-term trajectory Mt to the integrated control unit 70. The medium-term trajectory Mt is stored in the trajectory information storage unit 48 of the storage device 40.

The short-term trajectory generating unit 73 generates the short-term trajectory St on the basis of a calculation command Ae output from the integrated control unit 70, the local environment map information Iem, the host vehicle state information Ivh, the long-term trajectory Lt, and the medium-term trajectory Mt. Since it is calculated as a sequence of points having a shortest timewise distance therebetween, the short-term trajectory St corresponds with the vehicle dynamics of the host vehicle 11. Therefore, at each of the individual coordinate points that make up the short-term trajectory St, there are included such features as a position x in the longitudinal direction lying substantially along the center line CL of the lane markings (see FIG. 1), a position y in the lateral direction, a posture angle θz, a velocity vs, an acceleration va, and a steering angle δst, etc.

For example, the short-term trajectory generating unit 73 generates the short-term trajectory St by calculating coordinate points including the information of the above-described vehicle dynamics in a time period of one second and at intervals on the order of several ms (the standard calculation period). The short-term trajectory St is transmitted directly to the vehicle control unit 74, and is used by the vehicle control unit 74 in carrying out the travel control of the host vehicle 11. Further, the short-term trajectory generating unit 73 also outputs the generated short-term trajectory St to the integrated control unit 70. The short-term trajectory St is stored in the trajectory information storage unit 48 of the storage device 40.

On the other hand, so that the host vehicle 11 travels along the input short-term trajectory St, the vehicle control unit 74 converts the coordinate points including the vehicle dynamics into vehicle control values Cvh, and outputs the vehicle control values Cvh to the driving force device 28, the steering device 30, and the braking device 32. Further, information for driving the driving force device 28, the steering device 30, and the braking device 32 is transmitted as host vehicle state information Ivh to the external environment recognition unit 52.

[Specific Configuration of Local Environment Map Generating Unit 54]

In addition, during traveling of the host vehicle 11, and on the basis of the external environment recognition results Ip (external environment recognition information Ipr) recognized by the external environment recognition unit 52, the local environment map generating unit 54 of the vehicle control device 10 according to the present embodiment calculates the center line CL, the left and right boundary lines LB, RB, and the ideal travel route IDR (see FIG. 1). Furthermore, the local environment map generating unit 54 generates and outputs to the integrated control unit 70 the local environment map information Iem including the calculated center line CL, the left and right boundary lines LB, RB, the ideal travel route IDR, and event information such as stop positions and the like possessed by the external environment recognition information Ipr.

The center line CL, the left and right boundary lines LB, RB and the ideal travel route IDR are generated as a sequence of points in which coordinate points CP thereof are arranged at predetermined intervals on the host vehicle coordinate system with the host vehicle 11 acting as a reference. Owing to this feature, it is possible to improve the processing efficiency of the long-term trajectory generating unit 71, the medium-term trajectory generating unit 72, and the short-term trajectory generating unit 73 that utilize the local environment map information Iem.

As shown in FIG. 3, a provisional center line generating unit 80, a center line filtering unit 90, a left/right boundary line generating unit 100, and an ideal travel route generating unit 110 (travel route calculating unit) are provided inside the local environment map generating unit 54. The provisional center line generating unit 80 calculates the provisional center line PCL of the travel path, and the center line filtering unit 90 filters the provisional center line PCL to thereby calculate an optimal center line CL. Further, based on the center line CL, the left/right boundary line generating unit 100 calculates left and right boundary lines (a left boundary line LB, a right boundary line RB). The ideal travel route generating unit 110 calculates the ideal travel route IDR on the basis of the left and right boundary lines LB, RB. The processing content of the respective functional units will be described below in detail.

Using the external environment recognition information Ipr, the provisional center line generating unit 80 generates a virtual center line (provisional center line PCL) of the detected travel path (see FIG. 4). As described above, in the external environment recognition information Ipr, there are included the left and right recognition lines $y_l$, $y_r$ represented by equations (1) and (2). Accordingly, since the provisional center line PCL is represented by intermediate positions of equations (1) and (2) on the host vehicle coordinate system, the provisional center line PCL may be expressed by the following equation (3).

Provisional Center Line:

$$PCL = a_c x^2 + b_c x + c_c \qquad (3)$$

In this instance, $a_c = 0.5\,(a_l + a_r)$, $b_c = 0.5\,(b_l + b_r)$, and $c_c = 0.5\,(c_l + c_r)$.

Further, in the case of extracting a point sequence from the provisional center line PCL, the provisional center line generating unit 80 substitutes integers (x=1, 2, ..., n) for x in the above equation (3), whereby the provisional center line PCL can be represented by the discrete coordinate points $CP_1(x_1, y_1)$, $CP_2(x_2, y_2)$, ..., $CP_n(x_n, y_n)$. In addition, after calculating the provisional center line PCL (the sequence of points made up of the coordinate points $CP_1$, $CP_2$, ..., $CP_n$), the provisional center line generating unit 80 outputs the provisional center line PCL to the center line filtering unit 90.

As shown in FIG. 5, in order to calculate the center line CL, the center line filtering unit 90 internally includes an input data setting unit 91, a position and posture setting unit 92, and an output center line generating unit 93 (center line calculating unit). Further, the center line filtering unit 90 is equipped with a provisional center line storage unit 94, which is made up from a data area of the storage device 40, and in which there is stored the provisional center lines PCL received from the provisional center line generating unit 80, and a center line storage unit 95 in which there is stored the calculated center line CL. The provisional center line storage unit 94 and the center line storage unit 95 store a predetermined number of prior provisional center lines PCL and center lines CL, and when a new provisional center line PCL and a new center line CL are obtained, the newer versions erase and sequentially update the older versions thereof.

The input data setting unit 91 is a functional unit for the purpose of preparing input data used in calculations made by the output center line generating unit 93. As will be discussed later, the output center line generating unit 93 is configured to calculate the center line CL by a least squares method, and the input data setting unit 91 sets a plurality of coordinate points CP used as input data in such a least squares method.

In generating the input data, the input data setting unit 91 uses the new provisional center line PCL generated by the provisional center line generating unit 80, and a plurality of (in the present embodiment, three) prior provisional center lines PCL. The prior provisional center lines PCL are acquired in backwards order from the most recent provisional center line PCL toward the prior provisional center lines PLC. Hereinafter, the most recent provisional center line will be referred to by $PCL_0$, a one-time-prior provisional center line will be referred to by $PCL_{-t}$, a two-times-prior provisional center line will be referred to by $PCL_{-2t}$, and a three-times-prior provisional center line will be referred to by $PCL_{-3t}$. (refer also to FIG. 6B).

Figure 6A:
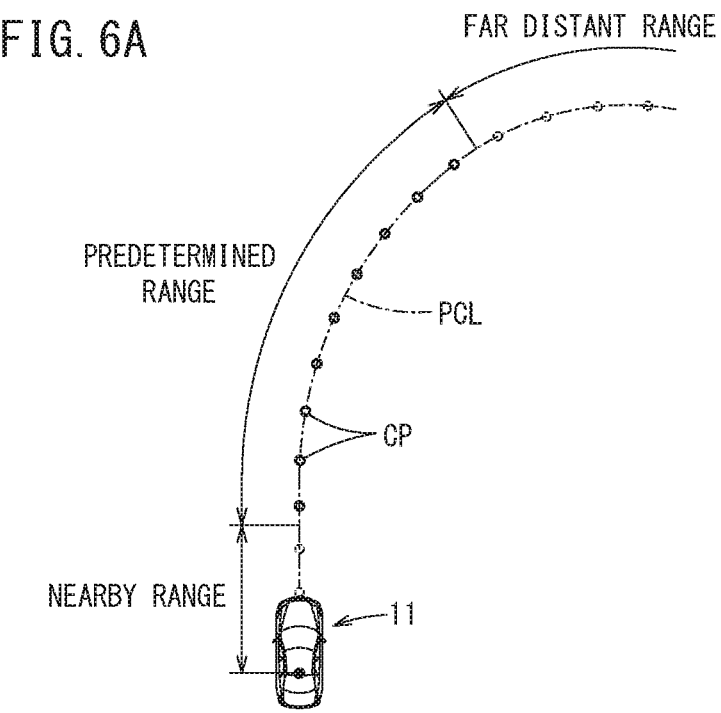
FIG. 6A is a first explanatory diagram for explaining a process of setting input data of an input data setting unit.

Further, concerning the provisional center lines $PCL_0$, $PCL_{-t}$, $PCL_{-2t}$, and $PCL_{-3t}$, coordinate points CP within a predetermined range preferably are used. More specifically, the provisional center lines PCL to be calculated by the provisional center line generating unit 80 from the external environment recognition information Ipr are influenced by the mounted positions and the image capturing ability, etc., of the cameras 33. For example, in the image information captured by the cameras 33, travel path regulating objects 200 such as lane markings and the like in the vicinity of the host vehicle 11 lie outside the angle of view (in a blind spot) of the cameras 33, and thus it is easy for such travel path regulating objects 200 to become unclear. Conversely, within a range that is distanced from the host vehicle 11, the detection accuracy deteriorates, because the travel path regulating objects 200 lie outside the angle of view of the cameras 33, or because the objects whose images are to be captured are too small, and the like. Therefore, as shown in FIG. 6A, concerning the provisional center lines $PCL_0$, $PCL_{-t}$, $PCL_{-2t}$, and $PCL_{-3t}$, the input data setting unit 91 sets a predetermined range by carrying out a process to exclude a nearby range in the vicinity of the host vehicle 11, and a far distant range separated a predetermined distance or more away from the host vehicle 11.

Figure 6B:
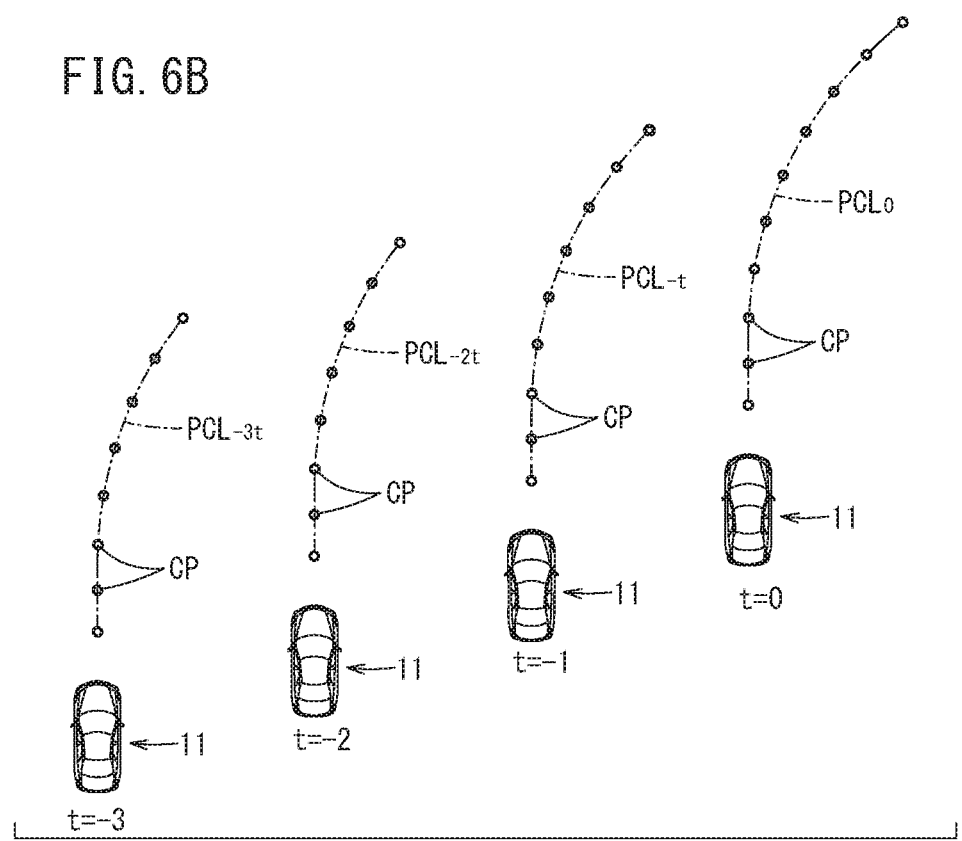
FIG. 6B is a second explanatory diagram for explaining a process of setting input data of the input data setting unit.

As shown in FIG. 6B, when the input data setting unit 91 determines predetermined ranges with respect to each of the provisional center lines $PCL_0$, $PCL_{-t}$, $PCL_{-2t}$, and $PCL_{-3t}$, the coordinate points CP contained within the predetermined ranges of the respective provisional center lines $PCL_0$, $PCL_{-t}$, $PCL_{-2t}$, and $PCL_{-3t}$ are extracted, respectively, as input data. In addition, based on a time-direction reference map 96 (see FIG. 7A) which is stored in a reference map storage unit 91a of the input data setting unit 91, the input data setting unit 91 assigns weights with respect to the provisional center lines $PCL_0$, $PCL_{-t}$, $PCL_{-2t}$, and $PCL_{-3t}$.

Figure 7A:
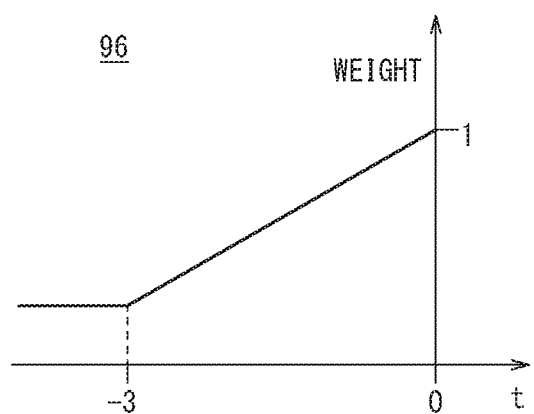
FIG. 7A is a graph illustrating by example a time-direction reference map.

For example, in the time-direction reference map 96 shown in FIG. 7A, a weight of the most recent provisional center line $PCL_0$ is 1, a weight of the one-time-prior provisional center line $PCL_{-t}$ is 0.75, a weight of the two-times-prior provisional center line $PCL_{-2t}$ is 0.5, and a weight of the three-times-prior provisional center line $PCL_{-3t}$ is 0.25. The input data setting unit 91 refers to the time-direction reference map 96, and assigns weights appropriately to the respective coordinate points CP of the most recent provisional center line $PCL_0$, and the respective coordinate points CP of the three prior provisional center lines $PCL_{-t}$, $PCL_{-2t}$, and $PCL_{-3t}$.

Concerning the external environment sensors 14, the most recent detection information that was detected thereby does not necessarily accurately detect the surrounding environment (the travel path regulating objects 200, etc.) of the host vehicle 11. For example, due to various factors such as visibility being blocked by other vehicles traveling in front of the host vehicle 11, or the road surface being difficult to see due to unevenness of the travel path or the like, there are certain cases in which the accuracy of the information may be higher using prior detection information, rather than using the most recent detection information. Stated otherwise, if the accuracy of the detection information is good, the provisional center line generating unit 80 calculates the provisional center line PCL with high accuracy, whereas if the accuracy of the detecting information is poor, the provisional center line generating unit 80 calculates the provisional center lines PCL with low accuracy.

Accordingly, when the travel path regulating objects 200 are extracted, the external environment recognition unit 52 preferably includes within the external environment recognition results Ip a degree of reliability Re as information pertaining to the detection accuracy, and such a degree of reliability Re is used in the processes performed by each of the functional units. In accordance with this feature, on the basis of the degree of reliability Re, the input data setting unit 91 can be configured to apply weights to the most recent provisional center line $PCL_0$ and the prior provisional center lines $PCL_{-t}$, $PCL_{-2t}$, and $PCL_{-3t}$. When objects are extracted by the external environment recognition unit 52, the degree of reliability Re thereof may be expressed and set as a numerical degree within a range from a lowest value of 0 to a highest value of 1.

For example, the external environment recognition unit 52 performs various processes (comparison of image information from the plurality of cameras, comparison of relative amounts of information of objects in the image information, comparison with prior image information, evaluation of the host vehicle state, evaluation of sharpness of the extracted objects, evaluation of brightness, evaluation of lightness and darkness, evaluation of the amount of image correction, detection of failure or degradation, detection of the state of communications, etc.) with respect to the detected information from the external environment sensors 14. Consequently, the external environment recognition unit 52 identifies road conditions (distance from the host vehicle 11 to the objects, good or bad condition of white lines and stop lines, quality of visibility by other vehicles and pedestrians), conditions of the external environment (the weather, direction of incidence of sunlight, ambient brightness, etc.), and conditions of the devices (whether lenses of the cameras 33 are good or bad, whether the communication state is good or bad, the presence or absence of failure or deterioration of the cameras 33, etc.), and then sets the degree of reliability Re.

Figure 7B:
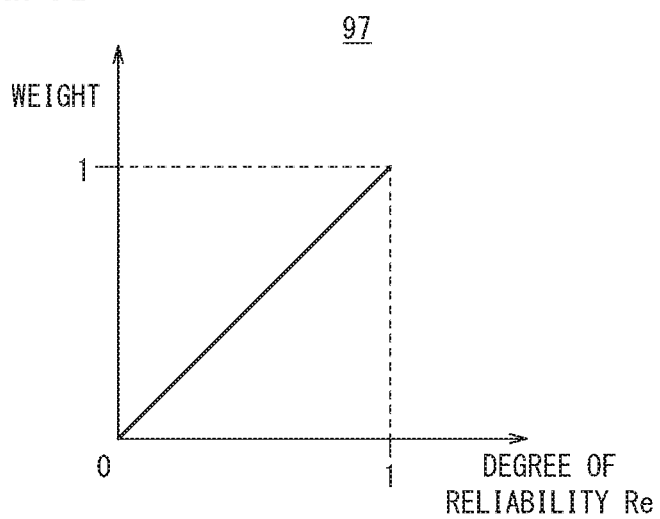
FIG. 7B is a graph illustrating a reliability reference map.

In addition, for example, the input data setting unit 91 refers to a reliability reference map 97 as shown in FIG. 7B, and assigns weights to each of the coordinate points CP on the basis of the degrees of reliability Re applied with respect to the most recent provisional center line $PCL_0$ and the prior provisional center lines $PCL_{-t}$, $PCL_{-2t}$, and $PCL_{-3t}$. Moreover, as shown in FIG. 7B, in the reliability reference map 97, although the degree of reliability Re and the weight are linearly proportional to each other, it is a matter of course that the reliability reference map 97 need not be limited to this feature.

Returning to FIG. 5, the position and posture setting unit 92 of the center line filtering unit 90 is a functional unit for the purpose of preparing constraint conditions to be used in the least squares method. In accordance with this feature, the host vehicle 11 is prevented from moving away from or being placed in an unreasonable posture with respect to the center line CL that was calculated by the output center line generating unit 93. On the basis of a one-time-prior calculated center line CL (hereinafter referred to as a center line $CL_{-t}$) and the current position P0 of the host vehicle 11 included within the external environment recognition information Ipr, the position and posture setting unit 92 sets the current position P0 and the posture of the host vehicle 11 as constraint conditions.

Figure 8C:
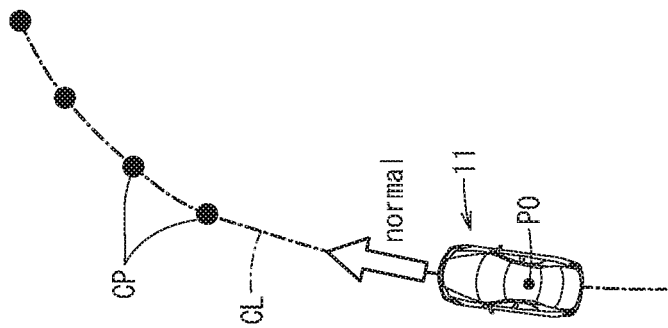
FIG. 8C is a plan view illustrating by example a state in which a current position and posture of the host vehicle and the center line are in alignment.

As noted previously, the input data setting unit 91 sets input data using the predetermined range of the provisional center line PCL (which does not include the nearby range of the host vehicle 11). However, if the center line CL is calculated as is, and without taking into consideration the nearby range of the host vehicle 11, for example as shown in FIG. 8A, there is a possibility of calculating a center line CL that is not located on the current position P0 or in the vicinity of the host vehicle 11.

Figure 8B:
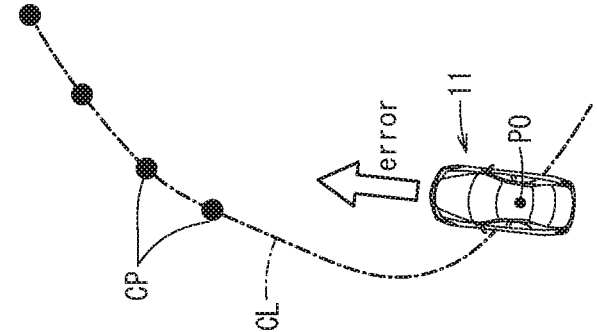
FIG. 8B is a plan view illustrating by example a state in which a posture of the host vehicle and the center line are out of alignment.
Figure 8A:
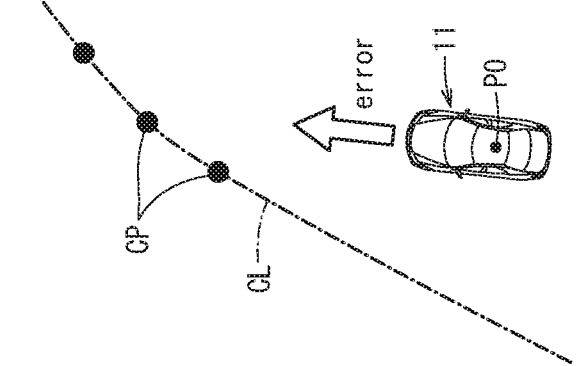
FIG. 8A is a plan view illustrating by example a state in which a current position of a host vehicle and the center line are deviated from each other.

Further, even if only the current position P0 of the host vehicle 11 is set based on the external environment recognition information Ipr, for example as shown in FIG. 8B, there is also a possibility of not being able to calculate a center line CL which is oriented in a direction in which the host vehicle 11 is capable of traveling from the current position P0 thereof. More specifically, as shown in FIG. 8C, by setting both the current position P0 of the host vehicle 11 and the posture of the host vehicle 11, it becomes possible to generate the center line CL so as to be directed toward a nose direction of the host vehicle 11.

Figure 9:
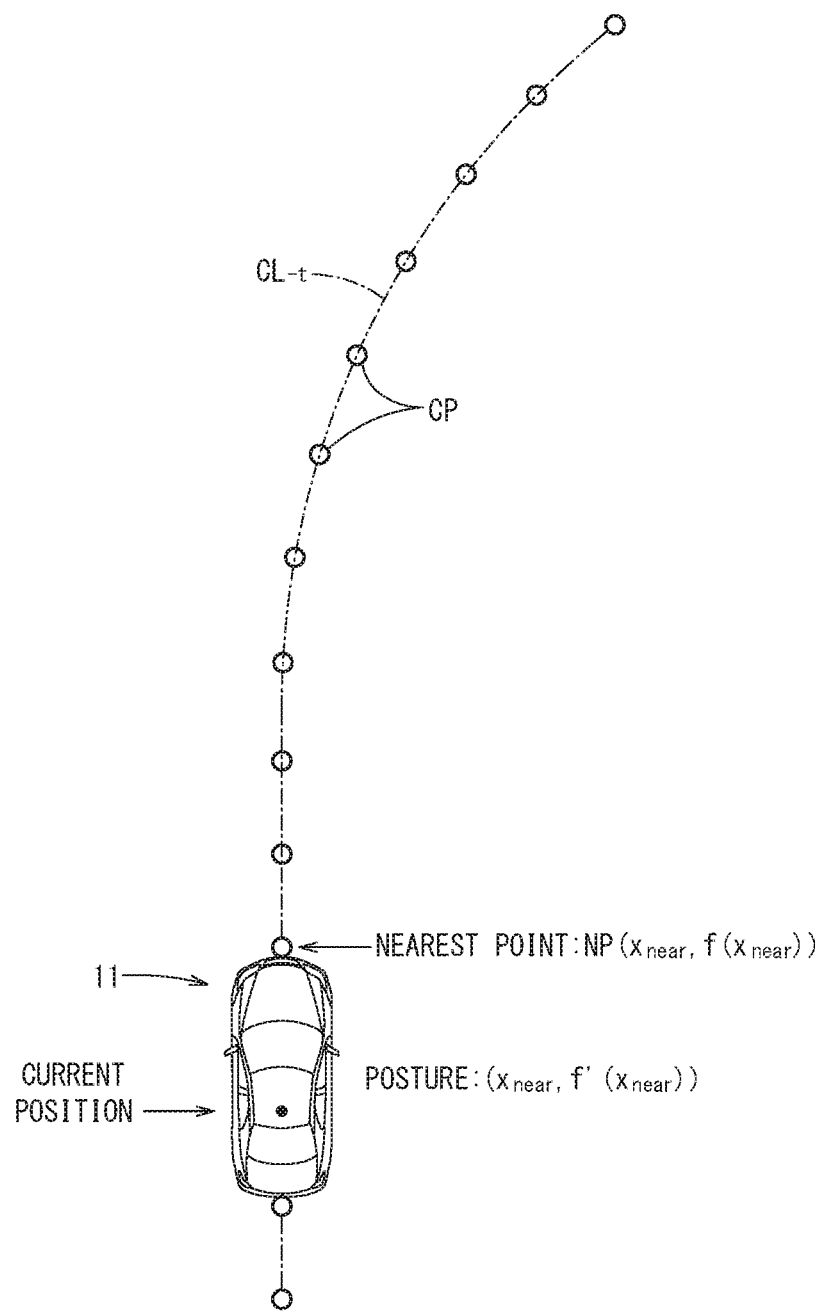
FIG. 9 is an explanatory diagram for explaining a process of setting the current position and posture of the host vehicle in a position and posture setting unit.

For example, as shown in FIG. 9, the position and posture setting unit 92 extracts a nearest point NP($x_{near}$, f($x_{near}$)), which is a coordinate point CP nearest to the current position P0 that the host vehicle 11 has traveled to from among the plurality of coordinate points CP of a previous center line $CL_{-t}$. At this time, it may be regarded as a condition of the nearest point NP that it is on a tip end side in front of the host vehicle 11. In addition, the position and posture setting unit 92 calculates a tangent line by differentiating the previous center line $CL_{-t}$ at the nearest point NP, and sets the slope of the tangent line as the orientation (posture) of the host vehicle 11. More specifically, the position and posture setting unit 92 can easily set the nearest point NP ($x_{near}$, f($x_{near}$)) and the posture ($x_{near}$, f'($x_{near}$)) as constraint conditions.

Returning to FIG. 5, the output center line generating unit 93 of the center line filtering unit 90 calculates a formal center line CL on the basis of the input data (the plurality of weighted coordinate points CP) transmitted from the input data setting unit 91, and the nearest point NP and posture transmitted from the position and posture setting unit 92. In addition, the calculated center line CL is output to the left/right boundary line generating unit 100, and together therewith, is stored in the center line storage unit 95.

As discussed above, using a least squares method, the output center line generating unit 93 determines the center line CL of a third order polynomial equation from the plurality of weighted coordinate points CP. At this time, there are applied as constraint conditions the nearest point NP ($x_{near}$, f($x_{near}$)) and the posture ($x_{near}$, f'($x_{near}$)) that were set by the position and posture setting unit 92. More specifically, in the case that the center line CL to be determined is a third order polynomial equation in the form of $y=ax^3+bx^2+cx+d$, the slope of the tangent line thereof is given by $y=3ax^2+2bx+c$. Therefore, the constraint conditions are represented by the following equations (4) and (5).

$$ax_{near}^3+bx_{near}^2+cx_{near}+d=p1 \qquad (4)$$

$$3aX_{near}^2+2bx_{near}+c=p2 \qquad (5)$$

In this instance, f ($x_{near}$)=p1 and f' ($x_{near}$)=p2.

Further, the center line CL to be determined is expressed by the following equation (6), and a square error J with respect to the coordinate points CP($x_i$, $y_i$) of the input data is expressed by the equation (7). In addition, when the square error J is minimized, equation (8) is satisfied with respect to k=1 to 4, and when equation (8) is rewritten, it can be expressed as the following equation (9).

$$f(x) = \sum_{j=i}^{4} a_j x^{j-1} \qquad (6)$$

$$J = \sum_{i=1}^{n}(y_i - f(x_i))^2 = \sum_{i=1}^{n}\left(y_i - \sum_{j=1}^{4} a_j x^{j-1}\right)^2 \qquad (7)$$

$$\frac{\partial J}{\partial a_k} = 2\sum_{i=1}^{n}\left(y_i - \sum_{j=1}^{4} a_j x^{j-1}\right)x_i^{k-1} = 0 \qquad (8)$$

$$\sum_{i=1}^{n}\sum_{j=1}^{4} a_j x^{j-1} x_j^{k-1} = \sum_{i=1}^{n} y_i x_i^{k-1} \qquad (9)$$

Further, from the fact that the constraint conditions in equation (9) are given by equations (4) and (5) above, when summarized in the form of a matrix, equation (9) can be expressed by the following equation (10). Moreover, in equation (10), the terms $\lambda_1$ and $\lambda_2$ are Lagrange's undetermined multipliers.

$$\begin{bmatrix} x_1^{0+0} + \ldots +x_n^{0+0} & \ldots & x_j^{0+3} + \ldots & x_n^{0+3} & x_{near}^0 & 0 \\ \vdots & & \vdots & \vdots & \vdots & \\ x_1^{3+0} + \ldots +x_n^{3+0} & \ldots & x_n^{3+3} + \ldots & x_n^{3+3} & x_{near}^3 & x_{near}^3 \\ x_{near}^0 & \ldots & x_{near}^3 & & 0 & 0 \\ 0 & \ldots & x_{near}^2 & & 0 & 0 \end{bmatrix} \qquad (10)$$

$$\begin{bmatrix} a_1 \\ a_2 \\ a_3 \\ a_4 \\ \lambda_1 \\ \lambda_2 \end{bmatrix} = \begin{bmatrix} x_1^0 y_1 + \ldots + x_n^0 y_n \\ x_1^1 y_1 + \ldots + x_n^1 y_n \\ x_1^2 y_1 + \ldots + x_n^2 y_n \\ x_1^3 y_1 + \ldots + x_n^3 y_n \\ p_1 \\ p_2 \end{bmatrix}$$

As described above, the output center line generating unit 93 calculates the center line CL of the third-order polynomial with the host vehicle 11 as a reference as shown in FIG. 8C, by implementing a least squares method with the current position P0 and posture of the host vehicle 11 serving as constraint conditions. Furthermore, the output center line generating unit 93 obtains the sequence of points in which the coordinate points CP are arranged, by taking the coordinate points CP (with a distance-based standard) at predetermined intervals in the calculated third-order polynomial.

Returning to FIG. 3, in the local environment map generating unit 54, upon the center line CL having been generated by the center line filtering unit 90, next, on the basis of this center line CL, the left/right boundary line generating unit 100 calculates the left and right boundary lines LB, RB of the travel path. The left and right boundary lines LB, RB are information indicative of the left and right travel capable range of the travel path, and in this sense, the left/right boundary line generating unit 100 also serves as an information acquisition unit that obtains information indicative of the left and right travel capable range.

Figure 10:
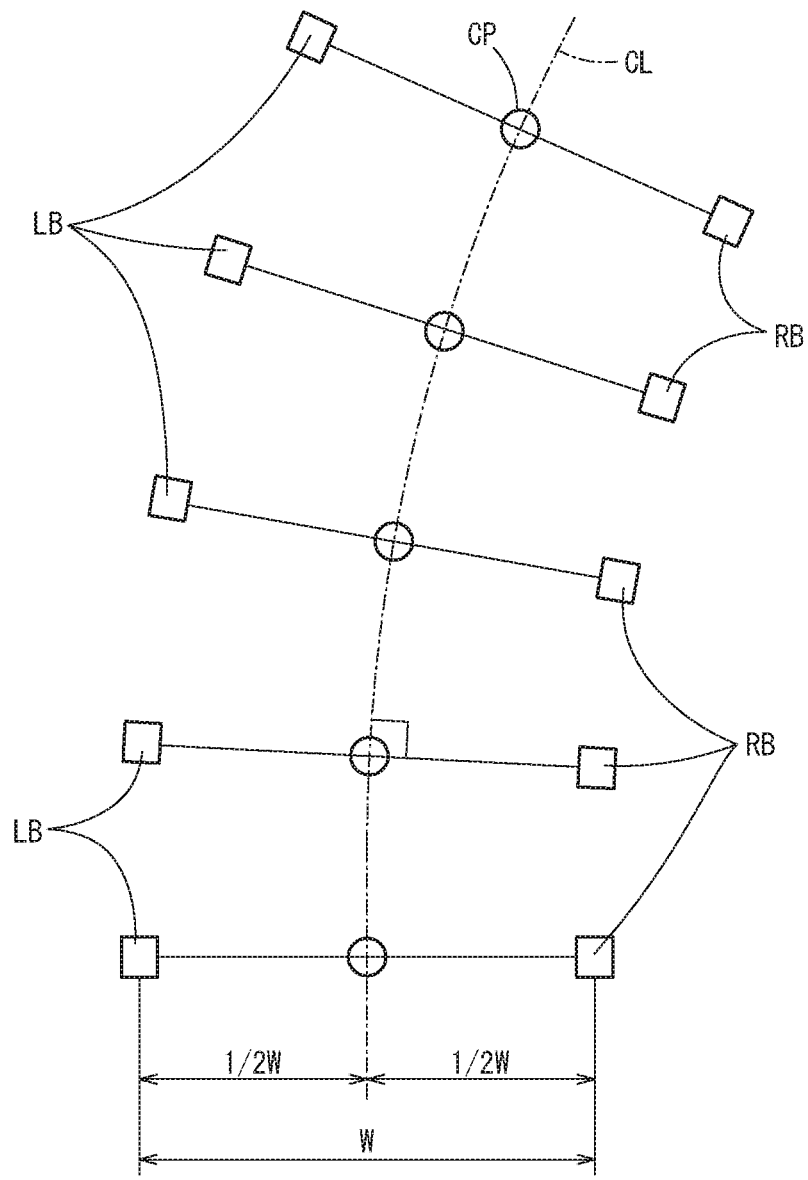
FIG. 10 is an explanatory diagram for explaining a process of a left/right boundary line generating unit for calculating left and right boundary lines.

The left and right boundary lines LB, RB can be obtained relatively easily on the basis of the sequence of points that make up the center line CL. More specifically, as shown in FIG. 10, the left/right boundary line generating unit 100 receives the center line CL from the center line filtering unit 90, and generates normal lines to the center line CL for each of the coordinate points CP. Since the normal lines extend in directions orthogonal to the tangent line for each of the coordinate points CP, the normal lines can easily be calculated. In addition, from the fact that the center line CL exists at an intermediate position between the left and right boundary lines LB, RB in the first place, the respective two points, each lying on the normal lines and having a distance from the center line CL that is one half of the lane width W, are taken as the coordinate points CP of the left and right boundary lines LB, RB. The lane width W is calculated as an interval between the left and right travel path regulating objects 200, which are included in the external environment recognition information Ipr. Consequently, pairs of coordinate points CP with the center line CL disposed at a center position therebetween are sequentially obtained, and a sequence of points in two rows in which the coordinate points CP are arranged can be set as the left and right boundary lines LB, RB.

Figure 11:
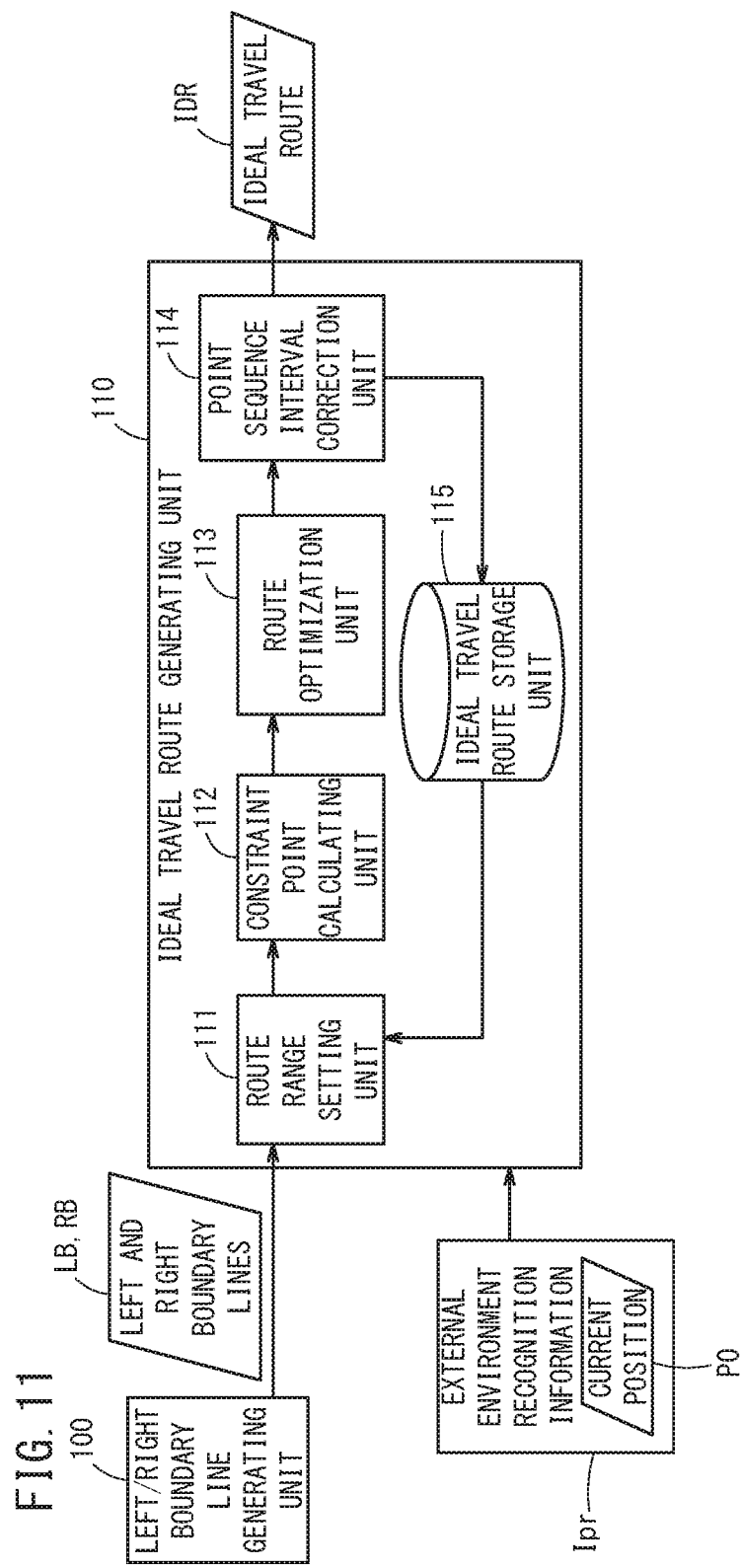
FIG. 11 is a block diagram showing the configuration of an ideal travel route generating unit depicted in FIG. 3.

When the left and right boundary lines LB, RB have been generated, the local environment map generating unit 54 carries out the process by the ideal travel route generating unit 110, and thereby calculates an ideal travel route IDR that is superior in terms of traveling efficiency and comfort. In order to calculate the ideal travel route IDR, as shown in FIG. 11, the ideal travel route generating unit 110 is provided therein with a route range setting unit 111, a constraint point calculating unit 112 (passage point calculating unit), a route optimization unit 113, and a point sequence interval correction unit 114. Further, in the interior of the ideal travel route generating unit 110, there is provided an ideal travel route storage unit 115 (a data area of the storage device 40) in which a plurality of calculated ideal travel routes IDR are stored. The ideal travel route storage unit 115 stores a predetermined number of prior ideal travel routes IDR, and when new ideal travel routes IDR are obtained, the newer versions erase and sequentially update the older versions thereof.

The route range setting unit 111 receives the left and right boundary lines LB, RB calculated by the left/right boundary line generating unit 100, and sets data that is used to generate the ideal travel route IDR. In setting such data, the route range setting unit 111 utilizes the left and right boundary lines LB, RB, the current position P0 of the host vehicle 11 included in the external environment recognition information Ipr, and the ideal travel route (hereinafter referred to as an ideal travel route $IDR_{-t}$) that was calculated previously and stored in the ideal travel route storage unit 115.

Figure 12:
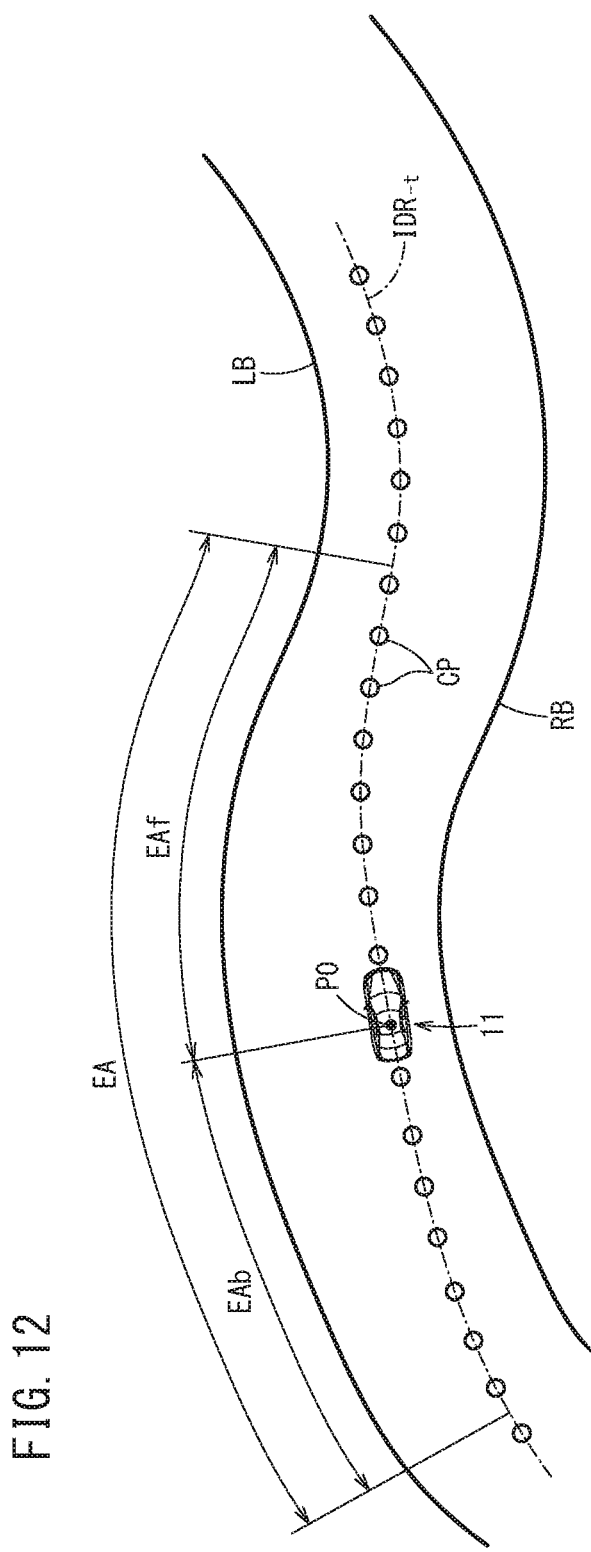
FIG. 12 is a plan view for explaining a process of a route range setting unit for setting a range from a previous ideal travel route.

More specifically, as shown in FIG. 12, the route range setting unit 111 determines whether or not a previous ideal travel route $IDR_{-t}$ exists inside the most recent right and left boundary lines LB, RB. In addition, from among the previous ideal travel route $IDR_{-t}$, only a predetermined distance in front of and behind the current position P0 of the host vehicle 11 (hereinafter referred to as an extraction area EA) is extracted. Stated otherwise, the extraction area EA is set with a length (pathway) defined in advance by a frontward range EAf in the travel direction and a backward range EAb in the travel direction with the host vehicle 11 acting as a reference point in the host vehicle coordinate system. For example, the frontward range EAf in the travel direction is 10 meters in front of the host vehicle 11, and the backward range EAb in the travel direction is 10 meters behind the host vehicle 11. Moreover, in the event that the previous ideal travel route $IDR_{-t}$ deviates from the left and right boundary lines LB, RB, an area up to the deviated position thereof is set as the extraction area EA.

Furthermore, the route range setting unit 111 performs a process to thin out the sequence of points of the extraction area EA of the ideal travel route $IDR_{-t}$ with a distance-based standard. This is because vibrations of the function are suppressed by a subsequent spline interpolation performed in the constraint point calculating unit 112. Thinning with a distance-based standard implies decreasing the number of coordinate points CP in the host vehicle coordinate system, in the case that the coordinate points CP of the previous ideal travel route $IDR_{-t}$ exist in plurality within a certain distance-based standard (for example, within a distance of one meter, the plurality of coordinate points CP are narrowed down to one coordinate point CP).

The constraint point calculating unit 112 calculates the constraint points X based on the ideal travel route $IDR_{-t}$ inside of the extraction area EA that was set by the route range setting unit 111. The constraint points X may be interpreted as representing targets (passage points) through which the host vehicle 11 passes on the basis of past traveling of the host vehicle 11.

Figure 13:
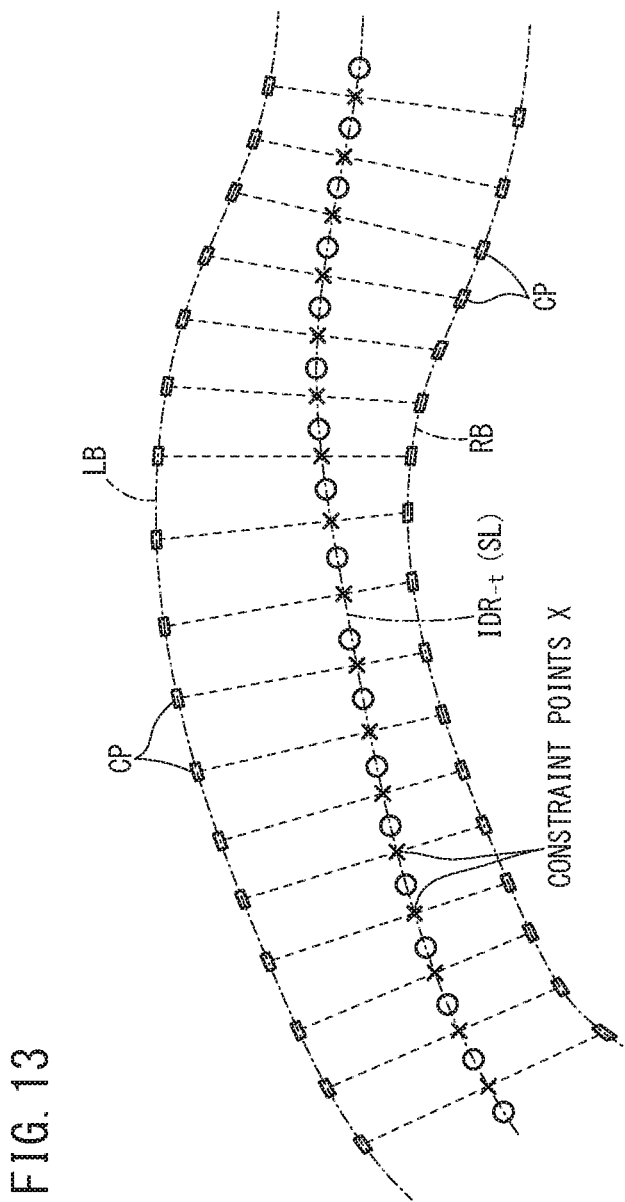
FIG. 13 is a plan view for explaining a process of a constraint point calculating unit for setting constraint points.

As shown in FIG. 13, the constraint point calculating unit 112 performs spline interpolation on the previous ideal travel route $IDR_{-t}$ (the thinned coordinate points CP thereof) within the extraction area EA, and thereby calculates interpolation lines SL. Moreover, the interpolation method is not limited to spline interpolation, and various methods such as Lagrange interpolation or the like may be applied.

Thereafter, the constraint point calculating unit 112 performs a correction on the sequence of points of the interpolation lines SL, so that they become equally spaced on the distance axis. Furthermore, the constraint point calculating unit 112 calculates intersection points of the interpolation lines SL with the line segments connecting the left and right pairs of coordinate points CP that make up the left and right boundary lines LB, RB, and then sets the intersection points as the constraint points X. Then, the constraint point calculating unit 112 outputs the calculated constraint points X (coordinate points) to the route optimization unit 113.

Figure 14:
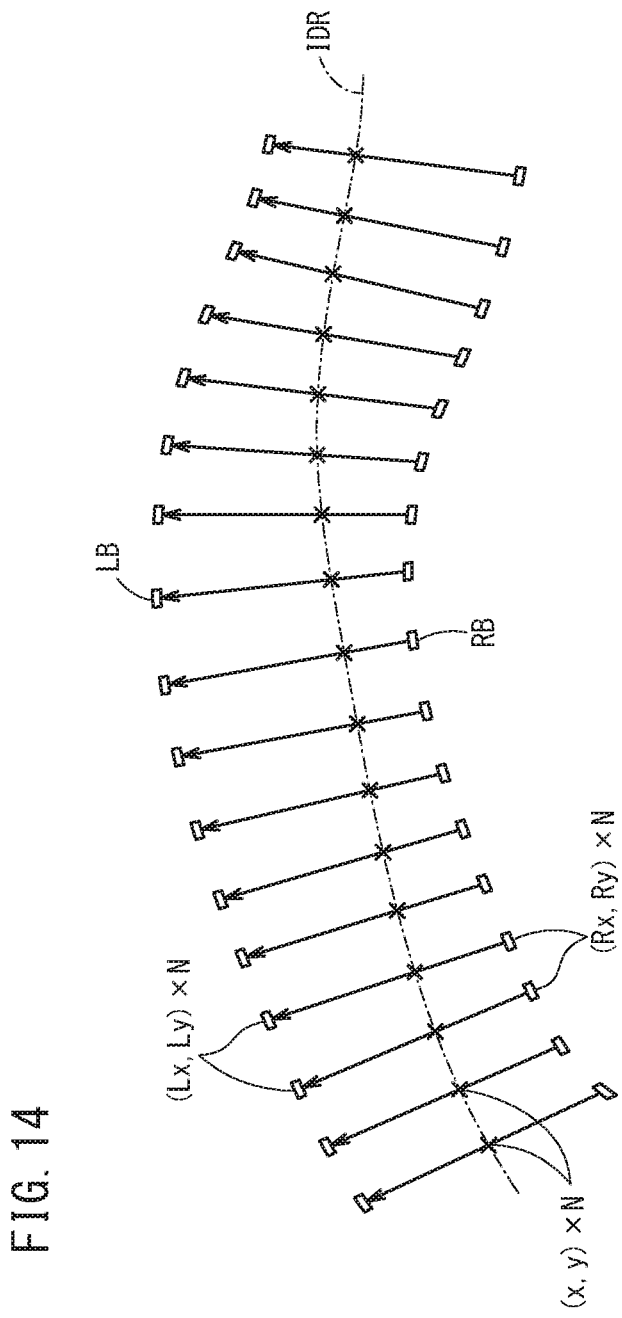
FIG. 14 is a plan view for explaining a process of a route optimizing unit for calculating an ideal travel route.
Figure 15:
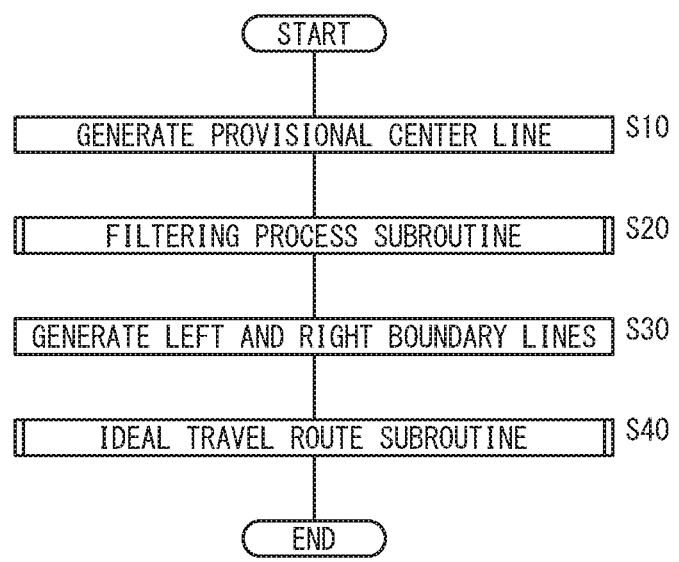
FIG. 15 is a flowchart showing a process flow of the local environment map generating unit for describing a center line, left and right boundary lines, and an ideal travel route.

The route optimization unit 113 of the ideal travel route generating unit 110 calculates an ideal travel route IDR using the constraint points X received from the constraint point calculating unit 112. More specifically, as shown in FIG. 14, with coordinates indicative of the ideal travel route IDR, the sequence of points making up the left boundary line LB can be expressed by (Lx, Ly)×N, the sequence of points making up the right boundary line RB can be expressed by (Rx, Ry)×N, and the point sequence of the constraint points X can be expressed by (x, y)×N. Thus, the point sequence of the constraint points X can be formulated as in the following equations (11) and (12).

$$x_i = Rx_i + \alpha_i(Lx_i - Rx_i) \quad (11)$$

$$y_i = Ry_i + \alpha_i(Ly_i - Ry_i) \quad (12)$$

In this instance, $0 \le \alpha_i \le 1$ and $i \in [0, N-1]$.

Moreover, the constraint points X (interpolation lines SL) can also cross over the left and right boundary lines LB, RB. In the case that the constraint points X cross over the left and right boundary lines LB and RB, the route optimization unit 113 may set the range to $0 - \beta_R \le \alpha_i \le 1 + \beta_L$ in accordance with an allowable offset ratio ($\beta$).

Accordingly, when calculating the ideal travel route IDR, the route optimization unit 113 formulates the objective function and the constraint conditions as a convex quadratic programming problem (nonlinear programming problem) with $\alpha i$ serving as an optimization variable. In this instance, the convex quadratic programming problem is expressed by the following equation (13), and furthermore, the constraint conditions are expressed by the equation (14) and the inequality (15).

$$J = 1/2x'Hx + q'x \quad (13)$$

$$A_{eq}x = b_{eq} \quad (14)$$

$$A_{in}x \le b_{in} \quad (15)$$

In this case, the constraint points X are used as an equality constraint condition of the equation (14). The inequality constraint condition of the inequality (15) uses an upper limit value/lower limit value of the optimization variable, while taking into consideration the vehicle body width of the host vehicle 11, and the lane width W calculated from the left and right boundary lines LB, RB. In addition, in the convex quadratic programming problem, a parameter x that minimizes J is calculated in equations (16) to (18), which are objective functions.

$$J = \sum_{j=1}^{N-2} \left( \left( \frac{d^2 x_j}{ds^2} \right)^2 + \left( \frac{d^2 y_j}{ds^2} \right)^2 \right) \quad (16)$$

$$J = \sum_{i=1}^{N-1} ((x_i - x_{i-1})^2 + (y_i - y_{i-1})^2) \quad (17)$$

$$J = \sum_{i=0}^{N} (0.5 - a_i)^2 \quad (18)$$

In this instance, equation (16) is an objective function that minimizes the curvature of the point sequence of the constraint points X, equation (17) is an objective function that minimizes the distance of the point sequence of the constraint points X, and equation (18) is an objective function that minimizes the difference between the point sequence of the constraint points X and the center line. When equations (16) to (18) are rewritten in the form of equation (13), H and q are calculated in each of the equations (i.e., Hc and qc which minimize the curvature, Hs and qs which minimize the distance, and Ht and qt which minimize the difference with the center line are obtained).

In addition, using the previously determined weights Wc, Ws, Wt, the route optimization unit 113 defines an objective function that summarizes the three conditions in the form of the following equation (19). In equation (19), the parameter x which minimizes J_all becomes a final ideal travel route IDR (i.e., a travel route in which the curvature is minimized, the distance is minimized, and the difference from the center line is minimized).

$$J\_all = 1/2x'H\_all x + q\_all'x \quad (19)$$

In this instance, H_all=Wc*Hc+Ws*Hs+Wt*Ht, q_all=Wc*qc+Ws*qs+Wt*Ht, and x={a0, a1, . . . , aN−1}.

Moreover, the weights Wc, Ws, Wt may be modified appropriately by the local environment map generating unit 54 in accordance with the situation of the host vehicle 11. For example, in the case that the curvature of the travel path is large or if meandering occurs, a more favorable route can be obtained by increasing the weight Wc for curvature minimization or the like. Accordingly, the local environment map generating unit 54 is capable of providing the ideal travel route IDR, which suppresses a reduction in the vehicle velocity together with reducing unnecessary movement of the steering wheel, with respect to the long-term trajectory generating unit 71, the medium-term trajectory generating unit 72, and the short-term trajectory generating unit 73.

Further, concerning the ideal travel route IDR calculated by the route optimization unit 113, the point sequence interval correction unit 114 of the ideal travel route generating unit 110 is a functional unit adapted to adjust the interval between the respective coordinate points CP and thereby generate the final ideal travel route IDR. The adjustment of the interval between the coordinate points CP can adopt the same method as that used by the process of the constraint point calculating unit 112 (i.e., a correction in which spline interpolation is performed with respect to a prior ideal travel route IDR_p, and the coordinate points CP are made equidistant on the distance axis).

By the above process, the local environment map generating unit 54 is capable of accurately generating the center line CL, the left and right boundary lines LB, RB, and the ideal travel route IDR. In addition, the center line CL, the left and right boundary lines LB and RB, and the ideal travel route IDR are included in the local environment map information Iem and are provided to each of the functional units, whereby they are used for subsequent generation of trajectories or the like.

[Process Flow of Local Environment Map Generating Unit 54]

The vehicle control device 10 according to the present embodiment is configured basically in the manner described above. Below, operations and effects of the vehicle control device 10 will be described together with a process flow which takes place in the local environment map generating unit 54.

The vehicle control device 10 executes an automatic driving control during traveling of the host vehicle 11, on the basis of an instruction from the driver (an ON operation of the automatic driving switch 22 or the like). During the automatic driving control, the surrounding environment of the host vehicle 11 is detected by the external environment sensors 14, the navigation device 16, the communications device 20, etc., whereby the external environment recognition unit 52 recognizes the surrounding environment of the host vehicle 11. In addition, when the external environment recognition information Ipr and the host vehicle state information Ivh are transmitted together with the calculation command Ab by the integrated control unit 70, the local environment map generating unit 54 initiates generation of the ideal travel range IDR as well as the left and right boundary lines LB, RB.

At this time, the provisional center line generating unit 80 generates the provisional center line PCL (step S10) by performing a polynomial approximation using the left and right recognition lines $y_l$, $y_r$ contained within the external environment recognition information Ipr. Next, the center line filtering unit 90 implements a filtering process subroutine and generates the center line CL using the provisional center line PCL (step S20). In addition, the left/right boundary line generating unit 100 generates the left and right boundary lines LB and RB using the generated center line CL (step S30). Finally, the ideal travel route generating unit 110 implements an ideal travel route subroutine and generates the ideal travel route IDR using the generated left and right boundary lines LB, RB (step S40).

Figure 16:
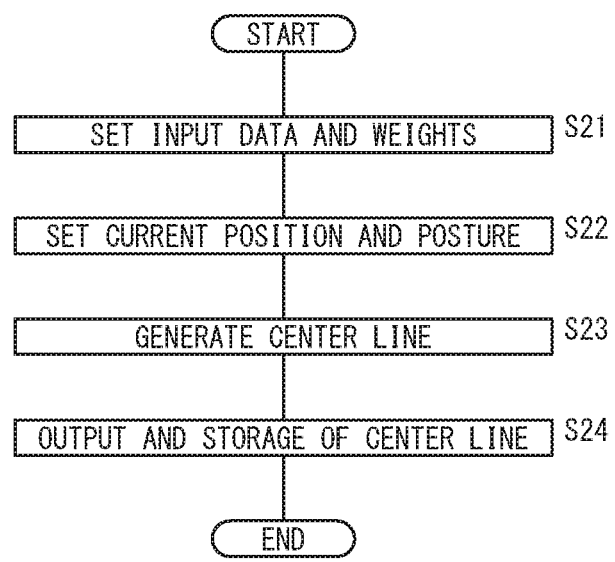
FIG. 16 is a flowchart showing a process flow of a filtering process subroutine depicted in FIG. 15.

As shown in FIG. 16, in the filtering process subroutine, the input data setting unit 91 sets the input data, together with assigning weights to each of the coordinate points CP included within each item of input data (step S21).

Furthermore, on the basis of a one-time-prior calculated center line CL and the current position P0 of the host vehicle 11, the position and posture setting unit 92 sets the current position P0 and the posture of the host vehicle 11 as constraint conditions (step S22). The process sequence of step S21 and step S22 may be reversed in order, or the processes thereof may be performed in parallel.

In addition, using a least squares method, the output center line generating unit 93 calculates a new center line CL on the basis of the input data (the plurality of coordinate points CP) set in step S21, and the constraint conditions set in step S22 (step S23). At this time, the center line CL is generated by performing a polynomial approximation, and together therewith, the center line CL is generated as a sequence of points in which a plurality of coordinate points CP are extracted along the polynomial approximation.

Further, when the center line CL is calculated, the center line filtering unit 90 outputs the center line CL to the left/right boundary line generating unit 100, together with storing the utilized provisional center line PCL in the provisional center line storage unit 94 so as to enable the next calculation, as well as storing the center line CL in the center line storage unit 95 (step S24). In the foregoing manner, the filtering process subroutine is brought to an end.

Figure 17:
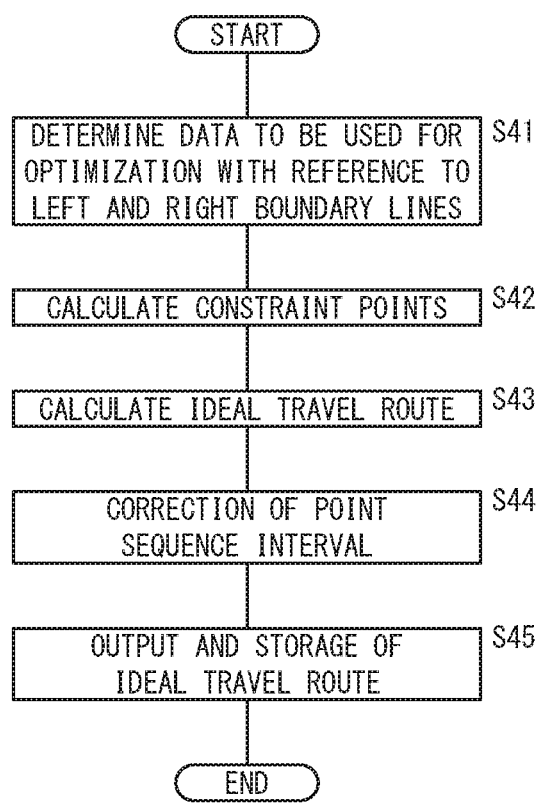
FIG. 17 is a flowchart showing a process flow of an ideal travel route subroutine depicted in FIG. 15.

Further, as shown in FIG. 17, in the ideal travel route subroutine, the route range setting unit 111 determines data to be used for optimization from the previously calculated ideal travel route $IDR_{-t}$, and with reference to the left and right boundary lines LB, RB generated by the left/right boundary line generating unit 100 (step S41). The input data is set by extracting a sequence of points inside of a predetermined distance before and after the current position P0 of the host vehicle 11, and furthermore, by thinning out the points on a distance-based standard.

Next, the constraint point calculating unit 112 calculates the constraint points on the basis of the sequence of points extracted in step S41 (step S42). At this time, the constraint point calculating unit 112 subjects the sequence of points to spline interpolation and produces a series of interpolation lines SL, and furthermore, after correcting the interpolation lines SL so as to be equally spaced on the distance axis, sets as the constraint points the intersection points between the interpolation lines SL and the line segments between the left and right boundary lines LB, RB.

In addition, using the left and right boundary lines LB, RB and the constraint points that were calculated in step S42, the route optimization unit 113 calculates the ideal travel route IDR in which the curvature, the distance, and the difference from the center line are minimized by solving the convex quadratic programming problem (step S43).

Thereafter, the point sequence interval correction unit 114 corrects the point sequence interval of the ideal travel route IDR that was calculated in step S43, and thereby generates the final ideal travel route IDR (step S44).

Further, after the ideal travel route IDR has been calculated, the ideal travel route generating unit 110 stores the ideal travel route IDR in the ideal travel route storage unit 115, so that it can be used in the next calculation (step S45). Accordingly, the ideal travel route subroutine is brought to an end.

As described above, the vehicle control device 10 according to the present embodiment includes the ideal travel route generating unit 110, whereby an ideal travel route IDR can be calculated in which traveling efficiency and comfort during automatic driving are superior. More specifically, the ideal travel route IDR is calculated as a route that minimizes the curvature, the travel distance, and the difference from the center line, and therefore, for example, in the case of a curve or the like, a travel route is obtained in which curvature is reduced, and a reduction in vehicle velocity and unnecessary movement of the steering wheel are suppressed. Therefore, by adjusting the velocity and the steering angle during traveling so as to follow the ideal travel route IDR, the vehicle control device 10 can cause the host vehicle 11 to travel in a satisfactory manner.

Further, the constraint point calculating unit 112 sets the constraint points X on the basis of the previous ideal travel route $IDR_{-t}$, thereby reflecting prior travel targets of the host vehicle 11. Therefore, by using the constraint points X as a constraint condition, it is possible to accurately calculate the ideal travel route IDR. The constraint point calculating unit 112 can easily and quickly set the constraint points X by interpolating the sequence of points of the prior ideal travel route $IDR_{-t}$ and thereby generate the interpolation lines SL. Furthermore, the extraction area EA is set by the route range setting unit 111, whereby the ideal travel route generating unit 110 is capable of enhancing efficiency in calculating the interpolation lines SL and the ideal travel route IDR.

In addition, by solving a convex quadratic programming problem in which there are used an objective function of the curvature, the travel distance, or the difference, and a constraint condition including the constraint points X, the ideal travel route generating unit 110 can easily obtain the ideal travel route IDR in which the curvature, the travel distance, and the difference are minimized. Further, by the point sequence interval correction unit 114 adjusting the interval between the coordinate points of the ideal travel route IDR, data of the coordinate points of the ideal travel route IDR can be handled easily when processing is performed using the ideal travel route IDR in a subsequent generation of trajectories or the like.

By the vehicle control device 10 calculating the left and right boundary lines LB, RB on the basis of the center line CL of the travel path, even if the information detected by the external environment sensors 14 or the like is insufficient, it is possible to obtain the left and right boundary lines LB, RB with high accuracy. Accordingly, the ideal travel route IDR is also calculated accurately. Further, the center line filtering unit 90 filters the provisional center line PCL that was generated by the provisional center line generating unit 80, whereby the center line CL of the travel path can be further optimized.

In addition, by utilizing a method of least squares on the input data that was set by the input data setting unit 91 and thereby calculating the center line CL, the output center line generating unit 93 is capable of calculating the center line CL with a small error. Further, the input data setting unit 91 sets the input data by using the most recent provisional center line $PCL_0$ and the plurality of prior provisional center lines $PCL_{-t}$, $PCL_{-2t}$, $PCL_{-3t}$, thereby preventing an inconvenience such as the center line CL being shifted in position significantly from the prior center line. In addition, since the accuracy of the travel information is low in the provisional center lines $PCL_{-t}$, $PCL_{-2t}$, $PCL_{-3t}$ in the nearby range and the far distant range of the host vehicle 11, by omitting such ranges, the vehicle control device 10 can calculate the center line CL with higher accuracy. Furthermore, by assigning weights to the most recent provisional center line $PCL_0$ and the plurality of prior provisional center lines $PCL_{-t}$, $PCL_{-2t}$, $PCL_{-3t}$, the vehicle control device 10 enables a weighted least squares method to be performed by the output center line generating unit 93, and thus it is possible to calculate the center line CL with better accuracy.

Still further, the output center line generating unit 93 performs the least squares method with the current position P0 and the posture of the host vehicle 11 acting as constraint conditions, whereby it is possible to prevent calculation of a center line CL that is deviated significantly from the current position P0 of the host vehicle 11, or a posture of the host vehicle 11 that changes abruptly and cannot be followed, or the like. In addition to the above, the position and posture setting unit 92 calculates a tangent line by differentiating the prior center line $CL_{-t}$ at the nearest point NP of the host vehicle 11, thereby making it possible to easily obtain the posture of the host vehicle 11.

The present invention is not limited to the embodiment described above, and it is a matter of course that various modified or additional configurations could be adopted therein without deviating from the essence and gist of the present invention. For example, a case can also be applied in which the vehicle control device 10 performs a driving assist that carries out only a speed control or carries out only a steering control, or a driving assist that guides the driver driving the vehicle with respect to the target vehicle speed and the target steering position from a monitor, a speaker, or the like as vehicle mounted devices. As an example, in such a driving assist, it is possible to provide guidance to the driver of an appropriate route by displaying the calculated ideal travel route IDR on a monitor of the host vehicle 11.

Further, according to the present embodiment, the ideal travel route generating unit 110 generates the ideal travel route IDR using the left and right boundary lines LB, RB which are generated by the left/right boundary line generating unit 100. However, the ideal travel route generating unit 110 may calculate the ideal travel route IDR directly from the travel path regulating objects 200 contained within the external environment recognition information Ipr, or alternatively, from a function approximated by a polynomial equation. In other words, the information indicative of the left and right travel capable range is not necessarily limited to the left and right boundary lines LB, RB.

What is claimed is:

1. A vehicle control device which is installed in a host vehicle and configured to be capable of implementing automatic driving or providing a driving assist, comprising:
   an external environment sensor adapted to detect information of an external environment of the host vehicle;
   an external environment recognizer adapted to recognize travel path regulating objects that regulate left and right boundaries of a travel path on which the host vehicle travels, based on the detected information of the external environment of the host vehicle;
   a provisional center line generator adapted to generate a provisional center line of the travel path based on the travel path regulating objects recognized by the external environment recognizer;
   a filter adapted to determine a center line by filtering the provisional center line generated by past provisional center lines which have been generated by the provisional center line generator;
   an information collector adapted to identify information indicative of a left and right travel capable range of the travel path based on the determined center line; and
   a travel route determiner adapted to:
      set passage points through which the host vehicle passes within the left and right travel capable range,
      determine a value with which at least one of a curvature of a curve derived from the passage points, a travel distance, and a difference from the center line of the left and right travel capable range is minimized, and determine an ideal travel route based on the determined value with which at least one of, the curvature, the travel distance, and the difference, is minimized.

2. The vehicle control device according to claim 1, further comprising:
   an ideal travel route storage device in which a prior ideal travel route that was determined by the travel route determiner is stored;
   wherein the travel route determiner sets the passage points based on the prior ideal travel route.

3. The vehicle control device according to claim 2, wherein:
   the left and right travel capable range and the ideal travel route contain information of a sequence of points in which a plurality of coordinate points are arranged; and
   the travel route determiner includes a passage point determiner adapted to:
   determine interpolation lines by interpolating the plurality of coordinate points of the prior ideal travel route in accordance with a predetermined interpolation method, and
   determine as the passage points, intersection points between the interpolation lines and line segments that connect pairs of coordinate points in the left and right travel capable range.

4. The vehicle control device according to claim 3, wherein:
   the travel route determiner includes a route range setting component adapted to set an extraction area within predetermined forward and rearward distances from the prior ideal travel route and a current position of the host vehicle; and
   the passage point determiner is adapted to determine the passage points inside of the set extraction area.

5. The vehicle control device according to claim 1, wherein the travel route determiner is adapted to determine the ideal travel route by solving a convex quadratic programming problem, in which there are used an objective function of the curvature, the travel distance, or the difference, and a constraint condition including the passage points are used.

6. The vehicle control device according to claim 5, wherein:
   the ideal travel route is constituted by a plurality of coordinate points; and
   the travel route determiner includes a point sequence interval corrector adapted to adjust an interval between the coordinate points of the ideal travel route.

7. The vehicle control device according to claim 1, wherein:
   the provisional center line includes information of a sequence of points in which a plurality of coordinate points are arranged; and
   the filter comprises:
   an input data setting component adapted to set input data including the plurality of coordinate points of the provisional center line; and
   a center line determiner adapted to determine the center line from the input data using a least squares method.

8. The vehicle control device according to claim 7, further comprising a provisional center line storage device in which the provisional center line is stored;
   wherein the input data setting component sets the input data using a most recent provisional center line, and a plurality of prior provisional center lines that are stored in the provisional center line storage device.

9. The vehicle control device according to claim 8, wherein the input data setting component sets as the input data, from among the plurality of prior provisional center lines a predetermined range between a nearby range in a vicinity of the host vehicle, and a far distant range separated a predetermined distance or more away from the host vehicle.

10. The vehicle control device according to claim 8, wherein the input data setting component sets the input data by assigning weights, respectively, to the most recent provisional center line and the plurality of prior provisional center lines.

11. The vehicle control device according to claim 7, further comprising a center line storage device which the center line determined by the center line determiner is stored;
   wherein the filter comprises a position and posture setting component adapted to set and supply to the center line determiner, as constraint conditions of the least squares method, a current position of the host vehicle, and the posture of the host vehicle based on a prior center line stored in the center line storage device.

* * * * *